(12) United States Patent
Nagasawa

(10) Patent No.: US 9,674,390 B2
(45) Date of Patent: Jun. 6, 2017

(54) PRINTING SYSTEM FOR USING AUTHENTICATION INFORMATION TRANSMITTED FROM AN EXTERNAL TERMINAL, PRINTOUT APPARATUS, AND RECORDING MEDIUM

(71) Applicant: Konica Minolta, Inc., Chiyoda-ku, Tokyo (JP)

(72) Inventor: Kenichi Nagasawa, Takatsuki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/757,506

(22) Filed: Dec. 23, 2015

(65) Prior Publication Data

US 2016/0212297 A1 Jul. 21, 2016

(30) Foreign Application Priority Data

Dec. 25, 2014 (JP) .................. 2014-262650

(51) Int. Cl.
*G06F 15/00* (2006.01)
*H04N 1/32* (2006.01)
(Continued)

(52) U.S. Cl.
CPC ....... *H04N 1/32101* (2013.01); *G06F 3/1222* (2013.01); *G06F 3/1238* (2013.01);
(Continued)

(58) Field of Classification Search
USPC .................................. 358/1.1–1.18, 2.1–3.3
See application file for complete search history.

(56) References Cited

U.S. PATENT DOCUMENTS

| 2002/0054337 A1* | 5/2002 | Makishima et al. ... G06F 3/1207 358/1.15 |
| 2003/0093675 A1 | 5/2003 | Hibino et al. |

(Continued)

FOREIGN PATENT DOCUMENTS

| EP | 1310862 A2 | 5/2003 |
| EP | 1380935 A2 | 1/2004 |

(Continued)

OTHER PUBLICATIONS

Extended European Search Report dated May 12, 2016, issued by the European Patent Office in corresponding European Application No. EP 15201576.4-1903 (9 pages).

(Continued)

*Primary Examiner* — Marcellus Augustin
(74) *Attorney, Agent, or Firm* — Buchanan Ingersoll & Rooney PC

(57) ABSTRACT

An external terminal transmits a print job to a printout apparatus and also transmits authentication information required for user authentication in printing that involves authentication to the printout apparatus at one time or a plurality of times and at a different time from the transmission of the print job. The printout apparatus identifies the authentication information received from the external terminal as information to be used for the user authentication when a transmission source user of the authentication information and a client user of the print job are determined to be the same on the basis of transmission-source user identification information for identifying the transmission source user and client user identification information for identifying the client user.

29 Claims, 20 Drawing Sheets

(51) Int. Cl.
*G06F 3/12* (2006.01)
*G06F 21/60* (2013.01)
*H04N 1/00* (2006.01)
*H04L 29/06* (2006.01)
*H04N 1/44* (2006.01)

(52) U.S. Cl.
CPC .......... *G06F 3/1292* (2013.01); *G06F 3/1293* (2013.01); *G06F 21/608* (2013.01); *H04L 63/08* (2013.01); *H04N 1/00307* (2013.01); *H04N 1/4413* (2013.01); *H04N 1/4426* (2013.01); *H04N 2201/0094* (2013.01); *H04N 2201/3205* (2013.01)

(56) References Cited

U.S. PATENT DOCUMENTS

| | | |
|---|---|---|
| 2006/0064738 A1 | 3/2006 | Hino et al. |
| 2006/0107039 A1 | 5/2006 | Sugiura et al. |
| 2007/0244963 A1 | 10/2007 | Hibino et al. |
| 2008/0180731 A1* | 7/2008 | Tomita ................. G06F 21/608 358/1.15 |
| 2012/0268770 A1 | 10/2012 | Fukuda |
| 2013/0308156 A1* | 11/2013 | Kakutani ........... G06K 15/4095 358/1.14 |
| 2014/0157372 A1 | 6/2014 | Shimizu |

FOREIGN PATENT DOCUMENTS

| | | |
|---|---|---|
| JP | 2005-085090 | 3/2005 |
| JP | 2005-119095 | 5/2005 |
| JP | 2006-93875 A | 4/2006 |
| JP | 2012-037986 | 2/2012 |

OTHER PUBLICATIONS

Notification of Reasons for Refusal issued in corresponding Japanese Patent Application No. 2014-262650, mailed Feb. 28, 2017; with English Translation (8 pages).

* cited by examiner

| MAC ADDRESS | USER ID | USER PASSWORD | DEPARTMENT ID | DEPARTMENT PASSWORD |
|---|---|---|---|---|
| ----**-01 | User U1 | ****** | Development | **** |

| USER ID | USER PASSWORD | DEPARTMENT ID | DEPARTMENT PASSWORD |
|---|---|---|---|
| User U1 | ****** | Development | **** |

INPUT USER INFORMATION

| | |
|---|---|
| USER ID | User U1 |
| USER PASSWORD | ****** |
| DEPARTMENT ID | Development |
| DEPARTMENT PASSWORD | **** |
| MAIL ADDRESS | user-u1@***.jp |

SET    CANCEL

| MAIL ADDRESS | USER ID | USER PASSWORD | DEPARTMENT ID | DEPARTMENT PASSWORD |
|---|---|---|---|---|
| user-u1@***.jp | User U1 | ****** | Development | **** |

INPUT USER INFORMATION

| USER ID | User U1 |
| --- | --- |
| USER PASSWORD | ****** |
| DEPARTMENT ID | Development |
| DEPARTMENT PASSWORD | **** |

USE TOUCH AND PRINT ☑

SET    CANCEL

INPUT USER INFORMATION

USER ID　　　　　　User U1

USER PASSWORD　　******

DEPARTMENT ID　　Development

DEPARTMENT
PASSWORD　　　　****

USE TOUCH AND PRINT　　☑

NOT REGISTER
PASSWORDS IN MFP　　☑

SET　　CANCEL

| MAC ADDRESS | USER ID | USER PASSWORD | DEPARTMENT ID | DEPARTMENT PASSWORD |
|---|---|---|---|---|
| ----**-01 | User U1 | | Development | |

INPUT USER INFORMATION

USER ID              │   User U1   │

USER PASSWORD        │   ******    │

DEPARTMENT ID        │ Development │

DEPARTMENT
    PASSWORD             │    ****     │

USE TOUCH AND PRINT              ☑

NOT REGISTER                     ☑
    PASSWORDS IN MFP ( SET )      ( CANCEL )
            │
           251
```

PRINTING SYSTEM FOR USING AUTHENTICATION INFORMATION TRANSMITTED FROM AN EXTERNAL TERMINAL, PRINTOUT APPARATUS, AND RECORDING MEDIUM

This application is based on Japanese Patent Application No. 2014-262650 filed on Dec. 25, 2014, the contents of which are hereby incorporated by reference.

BACKGROUND OF INVENTION

Technical Field

The present invention relates to a printing system including a printout apparatus such as a Multi-Functional Peripheral (MFP) and a technique related thereto.

Background Art

There are printout apparatuses that have authentication functions. User authentication may also be performed using an external terminal. For example, when a user uses an external terminal to use a printout apparatus, the printout apparatus requires authentication of the user. The printout apparatus authorizes only the user who has been successfully authenticated to use the printout apparatus through the use of the external terminal.

There are authentication functions that can set not only user IDs and passwords but also a variety of identification information (e.g., department IDs and passwords) as authentication information. Such authentication functions using a variety of authentication information are also referred to as "extensible authentication" or "advanced authentication."

In Japanese Patent Application Laid-Open No. 2006-93875, for example, a user terminal (external terminal) requires a user to input authentication information (a user ID, a user password, a department ID, and a department password) for execution of a print job. When the user has been successfully authenticated on the basis of the authentication information inputted by the user, an MFP (printout apparatus) executes the print job.

However, not all of the external terminals can get a complete set of authentication information required for extensible authentication. For example, a standard printing software program (standard printing software) that is stored as a standard printing function of the operating system (OS) of an external terminal may not be able to get a complete set of authentication information required for the extensible authentication.

More specifically, the standard printing software generally prepares user IDs and passwords as fixed standard items (input items), but does not prepare other items (e.g., department IDs and passwords). Thus, when department IDs and passwords are also required as authentication information for extensible authentication, a user of the external terminal cannot input department IDs and passwords by using the standard printing software. Even if the user transmit a print job to a printout apparatus that also requires other authentication information for extensible authentication, by using the standard printing software, the external terminal cannot get a complete set of authentication information required for the extensible authentication. Consequently, user authentication fails due to a lack of authentication information (lack of department IDs and passwords), and the MFP cannot execute the print job from the external terminal.

When (only) the standard printing software of the external terminal is used to transmit a print job and authentication information from the external terminal to the printout apparatus as described above, there are cases where necessary authentication information is not transmitted at the time of transmission of a print job, authentication fails due to a lack of authentication information required for extensible authentication, and the MFP cannot execute the print job.

This problem can arise not only when the external terminal cannot get a complete set of authentication information required for extensible authentication at the time of transmission of a print job, but also when the external terminal cannot get a complete set of authentication information required for other authentication at the time of transmission of a print job.

SUMMARY OF INVENTION

It is an object of the present invention to provide a technique for preventing authentication from failing due to a lack of authentication information.

According to a first aspect of the present invention, a printing system includes a printout apparatus that performs printing involving authentication, and an external terminal capable of communication with the printout apparatus. The external terminal includes a transmission unit that transmits a print job to the printout apparatus and transmits authentication information required for user authentication in printing that involves the authentication to the printout apparatus at one time or a plurality of times and at a different time from a time of transmission of the print job. The printout apparatus includes a communication unit that receives the print job from the external terminal and receives the authentication information from the external terminal at one time or a plurality of times and at a different time from a time of reception of the print job, an acquisition unit that acquires transmission-source user identification information for identifying a transmission source user of the authentication information when the authentication information is received from the external terminal, and acquires client user identification information for identifying a client user of the print job when the print job is received from the external terminal, and an identification unit that identifies the authentication information received from the external terminal as information to be used for the user authentication when the transmission source user and the client user are determined to be the same on the basis of the transmission-source user identification information and the client user identification information.

According to a second aspect of the present invention, a printout apparatus for performing printing that involves authentication and being capable of communication with an external terminal, includes a communication unit that receives a print job from the external terminal and receives authentication information required for user authentication in printing that involves the authentication from the external terminal at one time or a plurality of times and at a different time from a time of reception of the print job, an acquisition unit that acquires transmission-source user identification information for identifying a transmission source user of the authentication information when the authentication information is received from the external terminal, and acquires client user identification information for identifying a client user of the print job when the print job is received from the external terminal, and an identification unit that identifies the authentication information received from the external terminal as information to be used for the user authentication when the transmission source user and the client user are determined to be the same on the basis of the transmission-source user identification information and the client user identification information.

According to a third aspect of the present invention, a non-transitory computer-readable recording medium that records a program for causing a computer built into a printout apparatus for performing printing that involves authentication and being capable of communication with an external terminal to execute the steps of a) receiving a print job from the external terminal, b) acquiring client user identification information for identifying a client user of the print job when the print job is received from the external terminal, c) receiving authentication information required for user authentication in printing that involves the authentication from the external terminal at one time or a plurality of times and at a different time from a time of reception of the print job, d) acquiring transmission-source user identification information for identifying a transmission source user of the authentication information when the authentication information is received from the external terminal, and e) identifying the authentication information received from the external terminal as information to be used for the user authentication when the transmission source user and the client user are determined to be the same on the basis of the transmission-source user identification information and the client user identification information.

These and other objects, features, aspects and advantages of the present invention will become more apparent from the following detailed description of the present invention when taken in conjunction with the accompanying drawings.

BRIEF DESCRIPTION OF DRAWINGS

FIG. 6 illustrates an authentication information management table.

FIG. 7 illustrates an authentication information management table according to a second embodiment.

FIG. 9 illustrates a screen for inputting user information according to a third embodiment.

FIG. 10 illustrates an authentication information management table according to the third embodiment.

FIG. 13 illustrates a screen for inputting user information according to the fourth embodiment.

FIG. 16 illustrates a screen for inputting user information according to the fifth embodiment.

FIG. 17 illustrates an authentication information management table according to the fifth embodiment.

FIG. 20 illustrates a screen for inputting user information according to the sixth embodiment.

DETAILED DESCRIPTION OF PREFERRED EMBODIMENTS

Hereinafter, embodiments of the present invention will be described with reference to the drawings.

1. First Embodiment 1-1. Overall Configuration

Figure 1:
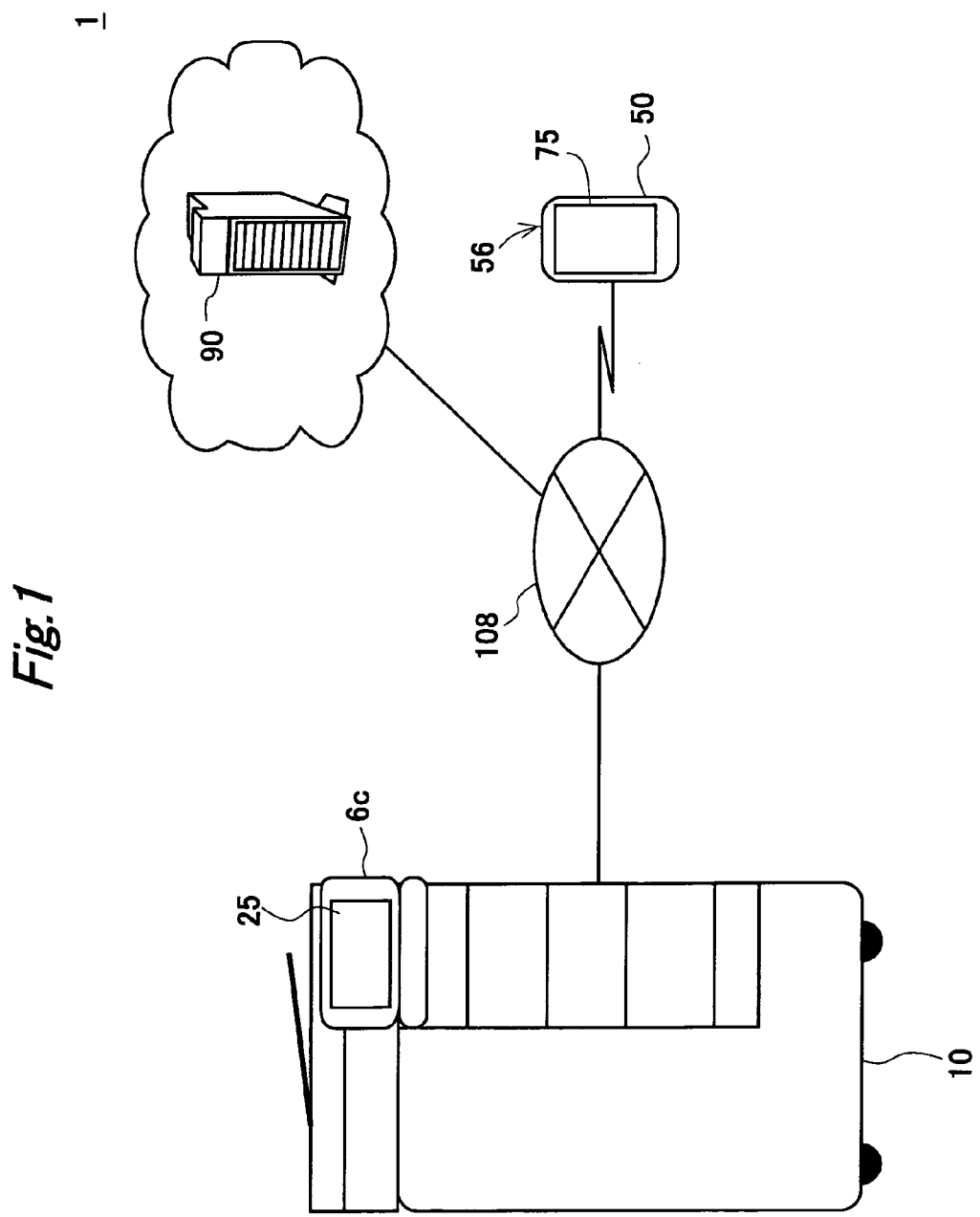
FIG. 1 illustrates a printing system.

FIG. 1 illustrates a printing system (print system) 1 according to the present invention. As illustrated in FIG. 1, the printing system 1 includes a printout apparatus 10, an external terminal 50, and an authentication server 90.

In the printing system 1, the printout apparatus 10 performs printing involving user authentication in cooperation with the authentication server 90. More specifically, upon receiving a print job from the external terminal 50, the printout apparatus 10 transmits authentication information required for user authentication to the authentication server 90. The authentication server 90 executes user authentication processing using the authentication information received from the printout apparatus 10, and transmits the result of the user authentication process (authentication result) to the printout apparatus 10. When the user has been successfully authenticated, the printout apparatus 10 executes the print job, whereas when the user has not been authenticated, the printout apparatus 10 discards the print job.

The printout apparatus 10, the external terminal 50, and the authentication server 90 are connected to one another via a network (communication network) 108. The network 108 is, for example, a local area network (LAN) or the Internet. The connection of the printout apparatus 10 and the authentication server 90 to the network 108 may be wired connection or may be wireless connection via a wireless LAN. The external terminal 50 is wirelessly connected to the network 108 via a wireless LAN, for example.

The authentication server 90 is an external device (external server) that is different from the printout apparatus 10 and the external terminal 50. The authentication server 90 is a server device that has an authentication function of authenticating users who use the printout apparatus 10. The authentication server 90 includes an authentication database. The authentication database stores authentication information (e.g., user IDs, user passwords, department IDs, and department passwords) that has been registered for each user who uses the printout apparatus 10 in advance by a system administrator (or users themselves). Upon receiving the authentication information from the printout apparatus 10 via the network 108, the authentication server 90 checks the authentication information received from the printout apparatus 10 against the authentication information registered in the authentication database. When the authentication information received from the printout apparatus 10 matches the authentication information registered in the authentication database, the authentication server 90 transmits the processing result (authentication result) indicating the success of the user authentication to the printout apparatus 10. On the other hand, when the authentication information received from the printout apparatus 10 does not match the authentication information registered in the authentication database, the authentication server 90 transmits the authentication result indicating the failure of the user authentication to the printout apparatus 10.

1-2. Configuration of Printout Apparatus

Figure 2:
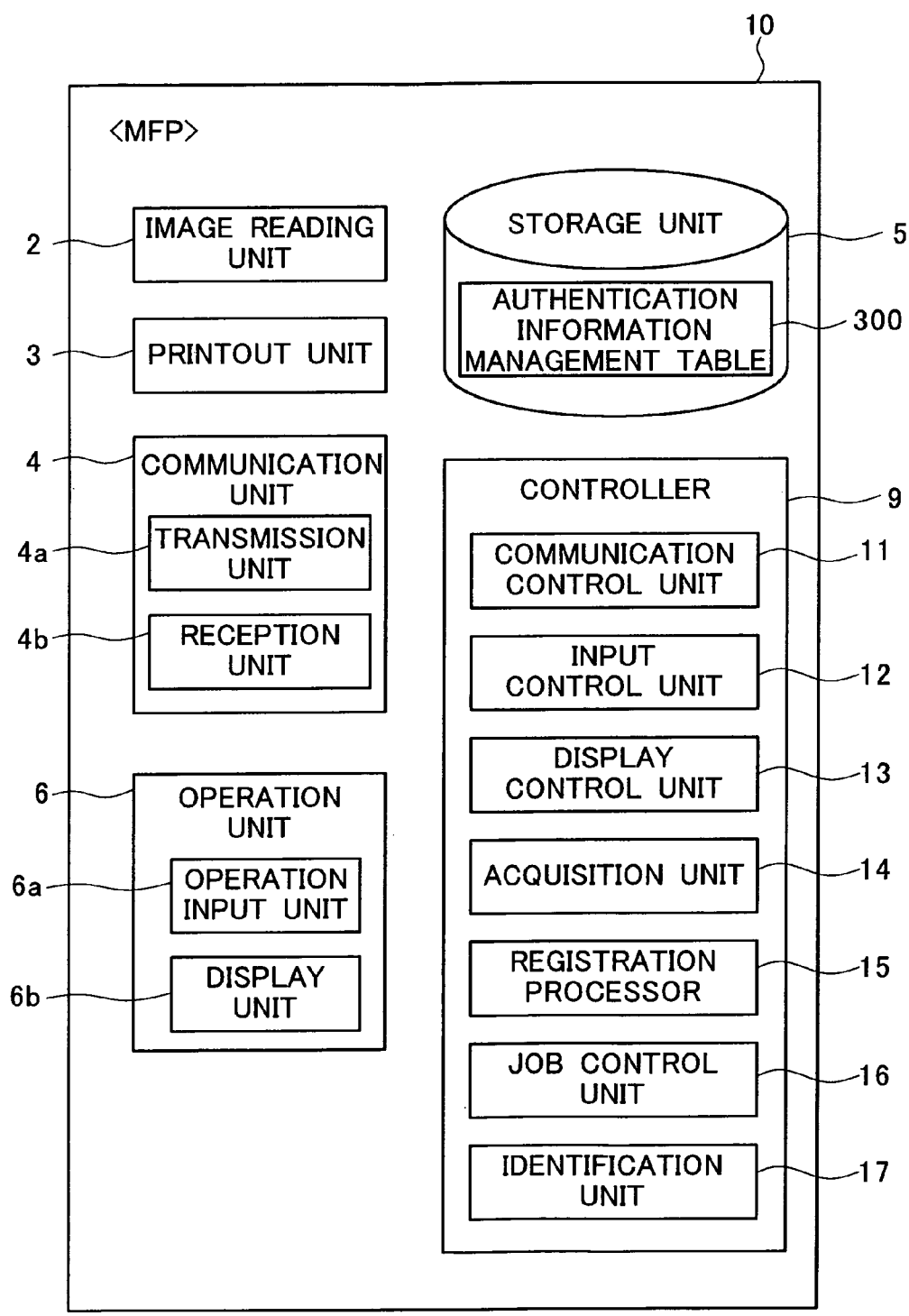
FIG. 2 is a functional block diagram of a printout apparatus (MFP).

FIG. 2 is a functional block diagram of the printout apparatus 10. Here, a Multi-Functional Peripheral (MFP) is taken as an example of the printout apparatus 10.

The MFP 10 is an apparatus (also, referred to as a "Multi-Functional Peripheral") having functions such as a scan function, a copy function, a facsimile function, and a box storage function. More specifically, the MFP 10 includes, for example, an image reading unit 2, a printout unit 3, a communication unit 4, a storage unit 5, an operation unit 6, and a controller (control unit) 9, as illustrated in the functional block diagram of FIG. 2, and implements various functions by operating these units in combination.

The image reading unit 2 is a processor that optically reads (i.e., scans) an original document placed at a predetermined position on the MFP 10 and generates image data of the original document (also referred to as an "original image" or a "scanned image"). The image reading unit 2 is also referred to as a "scanning unit."

The printout unit 3 is an output unit that prints out an image on various types of media such as paper on the basis of data regarding an object to be printed, in cooperation with a job control unit 16, which will be described later. The printout unit 3 is also referred to as, for example, a job execution unit.

The communication unit 4 is a processor capable of facsimile communication via a public network, for example. The communication unit 4 is also capable of network communication via the network 108. The network communication uses, for example, various types of protocols such as a Transmission Control Protocol/Internet Protocol (TCP/IP). Using the network communication enables the MFP 10 to exchange various types of data with desired destinations (e.g., the external terminal 50 and the authentication server 90). The communication unit 4 includes a transmission unit 4a that transmits various types of data and a reception unit 4b that receives various types of data.

The storage unit 5 is a storage device such as a hard disk drive (HDD). The storage unit 5 includes an authentication information management table 300 (see FIG. 6). The authentication information management table 300 registers (stores) transmission-source user identification information 151 (see FIG. 4) for identifying a transmission-source user who has transmitted authentication information (extensible authentication information) required for extensible authentication, in association with the extensible authentication information.

The operation unit 6 includes an operation input unit 6a that receives input of operations to the MFP 10, and a display unit 6b that displays and outputs various types of information.

The MFP 10 is provided with a generally plate-like operation panel unit 6c (see FIG. 1). The operation panel unit 6c includes a touch panel 25 (see FIG. 1) on the front side. The touch panel 25 not only functions as part of the operation input unit 6a but also functions as part of the display unit 6b. The touch panel 25 is configured by embedding various sensors or the like in a liquid crystal display panel, and is capable of displaying various types of information as well as receiving various types of input of operations from an operator.

The controller (control unit) 9 is a control device that is built into the MFP 10 and performs overall control of the MFP 10. The controller 9 is configured as a computer system that includes a CPU and various types of semiconductor memories (RAM and ROM), for example. The controller 9 implements various types of processors by causing the CPU to execute predetermined software programs (hereinafter also simply referred to as a "programs") stored in a ROM (e.g., EEPROM). Note that the programs (specifically, a group of program modules) may be recorded in a portable recording medium (or in other words, any of various types of non-transitory computer-readable recording media) such as a USB memory, read from the recording medium, and installed into the MFP 10. Alternatively, the programs may be downloaded via the network 108, for example, and installed into the MFP 10.

More specifically, the controller 9 implements various types of processors including a communication control unit 11, an input control unit 12, a display control unit 13, an acquisition unit 14, a registration processor 15, a job control unit 16, and an identification unit 17, as illustrated in FIG. 2, by executing the programs.

The communication control unit 11 is a processor that controls operations of communication with other devices (e.g., the external terminal 50) in cooperation with, for example, the communication unit 4.

The input control unit 12 is a control unit that controls operations of receiving input of operations from the user to the operation input unit 6a.

The display control unit 13 is a processor that controls display operations of the display unit 6b. The display control unit 13 causes, for example, the touch panel 25 to display an operation screen for operating the MFP 10.

The acquisition unit 14 is a processor that acquires user identification information (e.g., a media access control address (MAC address)) for identifying a user. For example, upon receiving the authentication information from the external terminal 50, the acquisition unit 14 acquires the transmission-source user identification information (MAC address) 151 for identifying a transmission-source user who has transmitted the authentication information. Upon receiving a print job, the acquisition unit 14 acquires client user identification information (MAC address) 152 for identifying a client user who has requested the print job. The acquisition unit 14 inquires about the MAC address of an external terminal 50 that corresponds to the IP address of the external terminal 50 to a router in the network 108 (wireless LAN) on the basis of the data received from the external terminal 50 and acquires the MAC address of the external terminal 50.

The registration processor 15 is a processor that registers the transmission-source user identification information (MAC address) 151 acquired by the acquisition unit 14 in association with the authentication information inputted by the user in the MFP 10 (authentication information management table 300; see FIG. 6).

The job control unit 16 is a processor that allows the print job received from the external terminal 50 to be spooled (stored) and also controls operations such as temporarily spooling such a print job. The job control unit 16 is also a processor that controls operations of executing print jobs in cooperation with the printout unit 3.

The identification unit 17 is a processor that controls operations, such as identifying the authentication information received from the external terminal 50 as information for use in extensible authentication, when the transmission-source user and the client user are determined to be the same on the basis of the transmission-source user identification information 151 and the client user identification information 152.

1-3. Configuration of External Terminal

Next, a configuration of the external terminal 50 will be described. The external terminal 50 is a device that controls printout by the MFP 10 and thus also referred to as a "print control device."

The external terminal 50 is a portable information input/output terminal device (also referred to as an "information terminal" or a "communication terminal") capable of network communication with the MFP 10 and the authentication server 90. Here, a tablet terminal is taken as an example of the external terminal 50. The present invention is, however, not limited to this example, and the external terminal 50 may be a smartphone or a personal computer, for example. Also, the external terminal 50 may be either a portable device (e.g., a personal digital assistant or a mobile terminal) or may be a stationary device.

Figure 3:
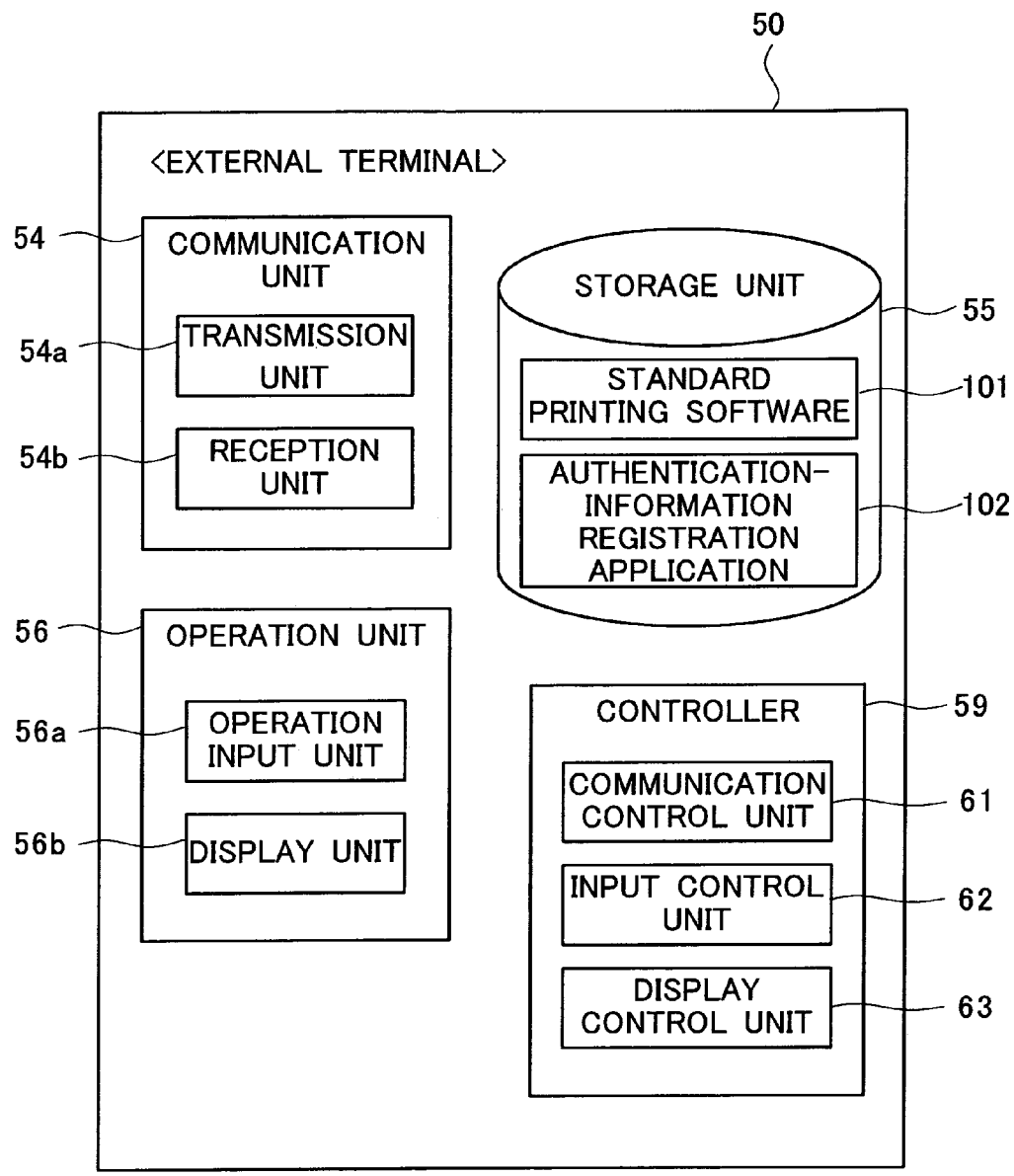
FIG. 3 is a functional block diagram illustrating a schematic configuration of an external terminal.

FIG. 3 is a functional block diagram illustrating a schematic configuration of the external terminal 50.

The external terminal 50 includes, for example, a communication unit 54, a storage unit 55, an operation unit 56, and a controller (control unit) 59, as illustrated in the functional block diagram in FIG. 3, and implements various functions by operating these units in combination.

The communication unit 54 is capable of network communication via the network 108. The network communication uses, for example, various types of protocols such as a Transmission Control Protocol/Internet Protocol (TCP/IP). Using the network communication allows the external terminal 50 to exchange various types of data with desired destinations (e.g., MFP 10). The communication unit 54 includes a transmission unit 54a that transmits various types of data and a reception unit 54b that receives various types of data. Note that various types of transmission data transmitted from the external terminal 50 include the IP address of the external terminal 50 as a source address.

The storage unit 55 is a storage device such as a nonvolatile semiconductor memory and stores various types of information. The storage unit 55 (temporarily) stores information such as authentication information inputted by the user.

The operation unit 56 includes an operation input unit 56a that receives input of operations to the external terminal 50, and a display unit 56b that displays and outputs various types of information. The external terminal 50 is provided with a touch panel 75 (see FIG. 1) that is configured by embedding various sensors or the like in a liquid crystal display panel. More specifically, the touch panel 75 is provided on substantially the entire front side of the generally plate-like external terminal 50, excluding the periphery (frame portion) of the external terminal 50, as illustrated in FIG. 1. In other words, the touch panel 75 not only functions as part of the operation input unit 56a and but also functions as part of the display unit 56b.

The controller (control unit) 59 is a control device that is built into the external terminal 50 and performs overall control of the external terminal 50. The controller 59 is configured as a computer system that includes a CPU and various types of semiconductor memories (RANI and ROM), for example. The controller 59 implements various types of processors by causing the CPU to execute predetermined software programs (hereinafter also simply referred to as "programs") stored in a storage unit (e.g., a semiconductor memory). Note that the programs (specifically, a group of program modules) may be recorded in a portable recording medium (or in other words, any of various types of non-transitory computer-readable recording media) such as a USB memory, read from the recording medium, and installed into the external terminal 50. Alternatively, the programs may be downloaded via the network 108, for example, and installed into the external terminal 50.

The external terminal 50 stores a standard printing software program (standard printing software) 101 as a standard printing function of the operating system (OS) of the external terminal 50. The standard printing software 101 has a function of generating a print job as well as a function of transmitting the generated print job to the MFP 10 in cooperation with the communication control unit 61. The standard printing software 101 prepares two items (user IDs and passwords) as fixed standard items (input items), and the external terminal 50 is capable of performing authentication using the standard items as authentication information (standard authentication information) in cooperation with the MFP 10. The authentication using the standard printing software 101 is also referred to as "standard authentication."

The external terminal 50 also has other programs installed therein, such as an application software program (authentication information registration application) 102 for registering authentication information required for extensible authentication (extensible authentication information) and so on in the MFP 10. The authentication information registration application 102 is an application dedicated to the purpose of registering extensible authentication information. The authentication information registration application 102 has a function of transmitting extensible authentication information or the like inputted by the user to the MFP 10 at a different time from the transmission of a print job, in cooperation with the communication control unit 61. Note that the exchange of various types of data is not conducted between the standard printing software 101 and the authentication information registration application 102.

The controller 59 implements various types of processors including the communication control unit 61, the input control unit 62, and the display control unit 63 by executing various types of programs.

The communication control unit 61 is a processor that controls operations of communication with the MFP 10 or the like in cooperation with the communication unit 54, for example.

The input control unit 62 is a processor that controls operations such as receiving input of operations from the user to the operation input unit 56a (e.g., touch panel 75).

The display control unit 63 is a processor that controls operations of display on the display unit 56b (e.g., touch panel 75). The display control unit 63 displays, for example, an operation screen for performing cooperative processing with the MFP 10 on the touch panel 75.

1-4. Operations

Figure 4:
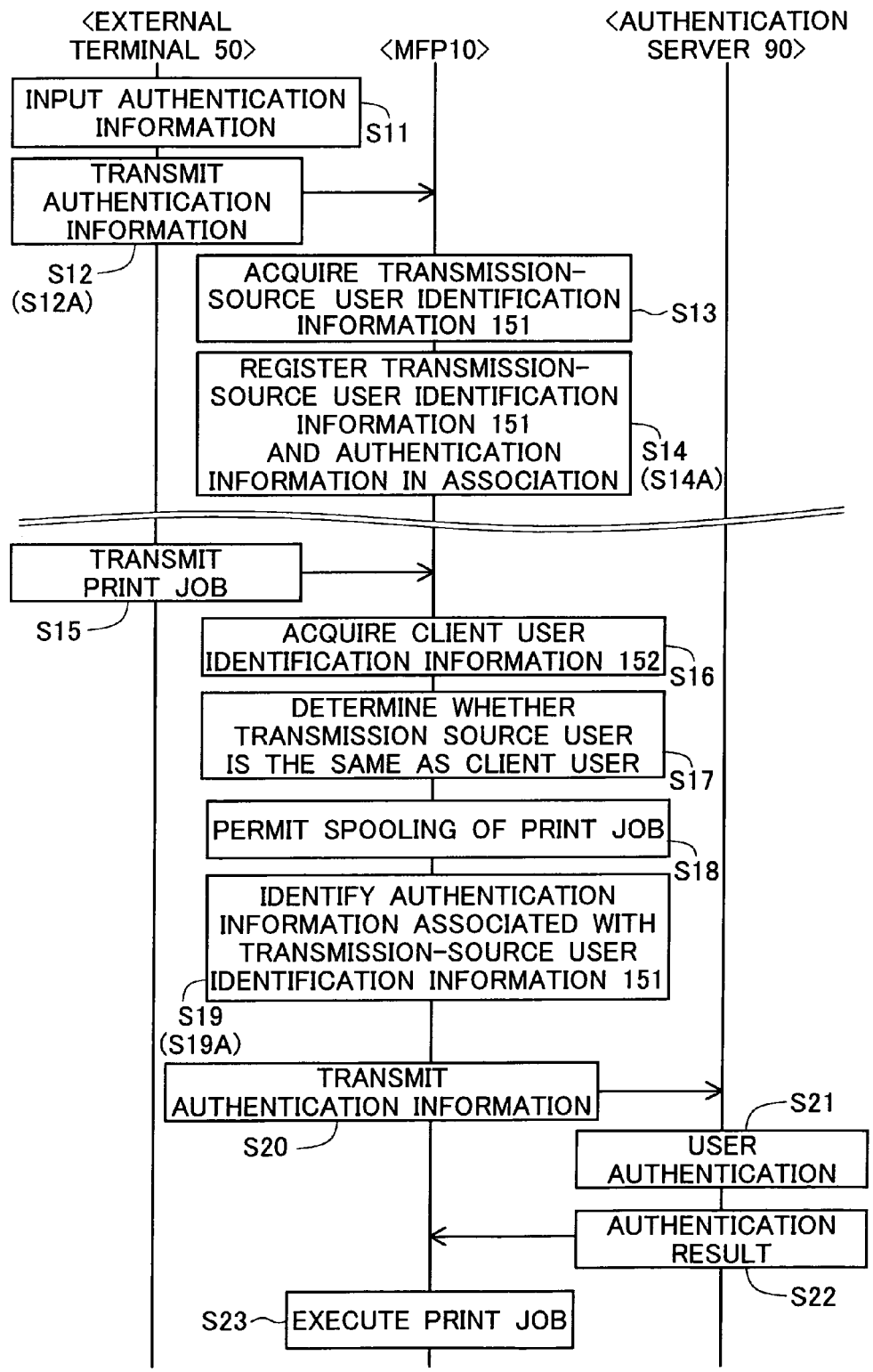
FIG. 4 is a timing chart illustrating an example of operations performed by the printing system.

FIG. 4 is a timing chart illustrating an example of operations performed by the printing system 1. Hereinafter, the operations of the printing system 1 will be described with reference to FIG. 4.

Here, the standard printing software 101 prepares user IDs and passwords as standard items, but does not prepare other items (e.g., department IDs and department passwords).

Thus, for example, when the department ID and the department password are required as authentication information for extensible authentication, the user of the external terminal 50 cannot use the standard printing software 101 to input the department ID and the department password. Even if the user transmits a print job by using the standard printing software 101 to the MFP 10 that also requires other authentication information for extensible authentication, the external terminal 50 cannot collect a complete set of authentication information required for extensible authentication. Consequently, user authentication fails due to a lack of authentication information (a lack of the department ID and the department password), and the MFP 10 cannot execute the print job received from the external terminal 50.

In this way, when only the standard printing software 101 of the external terminal 50 is used to transmit a print job and authentication information from the external terminal 50 to the MFP 10, the necessary authentication information (extensible authentication information) is not transmitted at the time of transmission of the print job, user authentication fails due to a lack of authentication information required for extensible authentication, and the MFP 10 cannot execute the print job.

In view of this, the present embodiment uses not only the standard printing software 101 but also the authentication information registration application 102. The authentication information registration application 102 is used to transmit authentication information required for extensible authentication at a time different from the time of transmission of the print job from the external terminal 50 to the MFP 10. When receiving the authentication information, the MFP 10 acquires transmission-source user identification information (here, a MAC address) 151 for identifying a transmission source user who has transmitted the authentication information. When receiving the print job, the MFP 10 acquires client user identification information (here, a MAC address) 152 for identifying a client user who has requested the print job. Then, when it is determined on the basis of the transmission-source user identification information 151 and the client user identification information 152 that the transmission-source user is the same as the client user, the MFP 10 identifies the authentication information that has been received from the external terminal 50 at a different time from the time of transmission of the print job, as information to be used for extensible authentication.

Processing Including Registration of
Transmission-Source User Identification
Information and Authentication Information First, prior to the transmission of a print job using the standard printing software 101, the authentication information registration application 102 is used to transmit authentication information (extensible authentication information) required for extensible authentication to the MFP 10, and the transmission-source user identification information 151 and the extensible authentication information are registered in advance in association with each other in the MFP 10. In the present embodiment, an identifier (MAC address) that is unique to the user's external terminal 50 is registered as the transmission-source user identification information 151 in the MFP 10. In steps S11 to S14 in FIG. 4, processing including registration of the transmission-source user identification information (MAC address) 151 and the authentication information is performed.

In step S11, the external terminal 50 (input control unit 62) receives input of authentication information (extensible authentication information) required for the extensible authentication from a user by using the authentication information registration application 102.

More specifically, when the external terminal 50 has received input of a command to activate the authentication information registration application 102 from a user (e.g., a user U1 of the external terminal 50), a user information input screen 200(201) (see FIG. 5) is displayed on the touch panel 75 of the external terminal 50.

Figure 5:
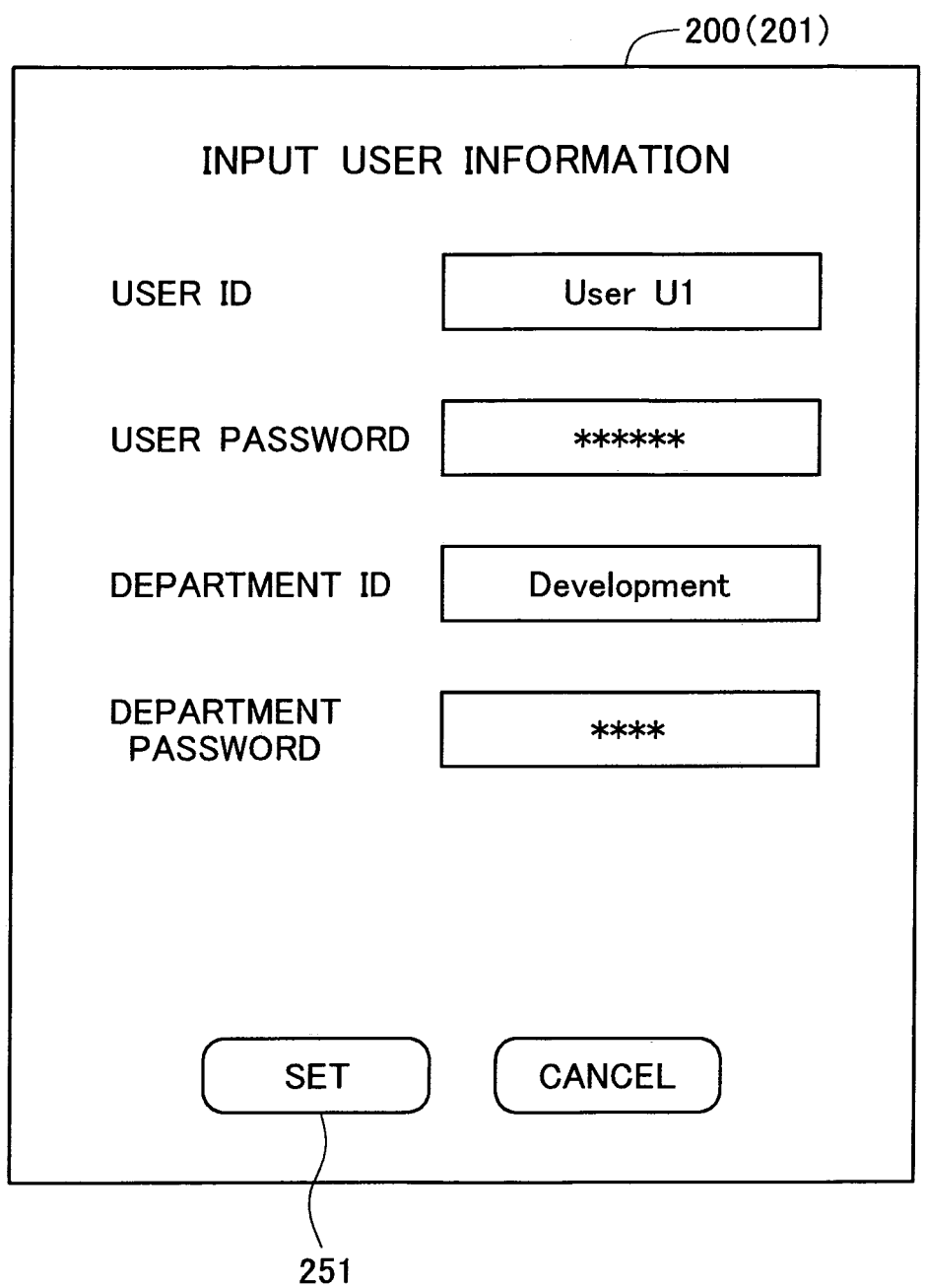
FIG. 5 illustrates a screen for inputting user information.

FIG. 5 illustrates the user information input screen (authentication information input screen) 200(201). As illustrated in FIG. 5, the user information input screen 200(201) displays four input items (user ID, user password, department ID, and department password) as extensible authentication information. The extensible authentication information is authentication information required for user authentication for printing that involves extensible authentication. The extensible authentication information includes items that cannot be input by using the standard printing software 101. To be specific, the extensible authentication information includes not only authentication data of standard items (items such as a user ID and a user password that can be input by using the standard printing software 101), but also authentication data of items other than the standard items. In response to input of an operation to the user information input screen 200(201), the input control unit 62 receives input of extensible authentication information from the user (user U1). Note that the information inputted on the user information input screen 200 by the user (user U1) is stored in the storage unit 55 of the external terminal 50.

When the extensible authentication information is input from the user (user U1) and a SET button 251 (see FIG. 5) is pressed, the external terminal 50 (transmission unit 54a) transmits the extensible authentication information inputted by the user to the MFP 10 (step S12 (S12A)). As described above, the data transmitted from the external terminal 50 to the MFP 10 includes the IP address of the external terminal 50 as a source address.

Upon receiving the extensible authentication information from the external terminal 50, the MFP 10 (the reception unit 4b and the acquisition unit 14) acquires the transmission-source user identification information 151 for identifying a transmission-source user of the extensible authentication information (step S13). More specifically, on the basis of the data received about the extensible authentication information, the acquisition unit 14 inquires of a router in the wireless LAN about the MAC address of the external terminal 50 that corresponds to the IP address of the external terminal 50, and acquires the MAC address. Here, the MAC address ("-----01") of the external terminal 50** of the user U1 is acquired.

In the present embodiment, a single (dedicated) external terminal (dedicated terminal) 50 is allocated on a user-by-user basis. In other words, the user of the external terminal 50 is in one-to-one correspondence with the MAC address of the external terminal 50. Identifying the MAC address of the external terminal 50 in this situation enables the user of the external terminal 50 to be identified to such an extent that the user of the external terminal 50 can be distinguished from other users. In short, for example, the transmission source user of the extensible authentication information can be (substantially) identified. It is also possible, as will be described later, to (substantially) identify the client user of the print job. Note that it is sufficient for the user of the external terminal 50 to be identified to such an extent that the user of the external terminal 50 can be distinguished from other users, and it is not so much necessary to identify who is the user of the external terminal 50 (e.g., the user of the external terminal 50 is the user U1).

When the transmission-source user identification information (the MAC address of the external terminal 50) 151 is acquired, the MFP 10 (registration processor 15) registers the acquired MAC address and the extensible authentication information in association with each other in an authentication information management table 300(301) (see FIG. 6) (step S14(S14A)). The registration processor 15 also registers the acquired MAC address in the authentication information management table 300(301) as information (hereinafter, "user-authorized-to-spooling identification information") for identifying a user who is authorized to spooling. In this way, the MAC address of the external terminal 50 acquired in step S13 is registered in the MFP 10 as the transmission-source user identification information 151 for identifying the transmission-source user of the extensible authentication information, and is also registered in the MFP 10 as the user-authorized-to-spooling identification information for identifying a user who is authorized to spooling.

FIG. 6 illustrates the authentication information management table 300(301). As illustrated in FIG. 6, the MAC address acquired in step S13 (the MAC address "-----01") of the external terminal 50 of the user U1) and the extensible authentication information inputted on the user information input screen 201 (see FIG. 5) by the user U1 are registered in association with each other in the authentication information management table 301**.

In this way, the transmission-source user identification information (the MAC address of the external terminal 50) 151 and the extensible authentication information (user ID, user password, department ID, and department password) required for extensible authentication are registered in advance in association with each other in the MFP 10 (authentication information management table 301).

Processing Including User Authentication

Next, a print job generated by the user is transmitted from the external terminal 50 to the MFP 10 by using the standard printing software 101. For the reception of a print job, user authentication for printing that involves extensible authentication is performed. In steps S15 to S23 in FIG. 4, processing including the transmission and reception of a print job and the user authentication is performed.

In step S15, the external terminal 50 (transmission unit 54a) transmits a print job (print target job that involves extensible authentication) to the MFP 10 by using the standard printing software 101. More specifically, when the external terminal 50 has received input of a command to activate the standard printing software 101 from a user (user U1), a print setting screen (not shown) of the standard printing software 101 is displayed on the touch panel 75 of the external terminal 50. On the print setting screen, the user (user U1) generates a print job by making desired print settings for print target data and provides the print job with an instruction to execute the print job. The print job provided with the execution instruction from the user (user U1) is then transmitted from the external terminal 50 (external terminal 50 of the user U1) to the MFP 10 (step S15).

When the print job is received from the external terminal 50, the MFP 10 (the reception unit 4b and the acquisition unit 14) acquires the client user identification information 152 for identifying the client user of the print job (step S16). More specifically, on the basis of the received data (print data) regarding the print job, the acquisition unit 14 inquires of a router in the wireless LAN about the MAC address of the external terminal 50 that corresponds to the IP address of the external terminal 50, and acquires the MAC address. Here, the MAC address ("-----01") of the external terminal 50** of the user U1 is acquired.

When the client user identification information (the MAC address of the external terminal 50) 152 is acquired, the MFP 10 (acquisition unit 14) determines on the basis of the transmission-source user identification information 151 and the client user identification information 152 whether or not the transmission-source user is the same as the client user (step S17). More specifically, it is determined whether or not the client user identification information 152 is the same as the transmission-source user identification information 151 that has already been registered in the MFP 10. In other words, it is determined whether or not the same MAC address as the MAC address acquired as the client user identification information 152 has already been registered in the MFP 10 as the transmission-source user identification information 151. Here, it is determined that the same MAC address as the MAC address acquired at the time of reception of the print job (the MAC address "-----01" of the external terminal 50 of the user U1) has already been registered in the MFP 10. When the client user identification information 152 is determined to be the same as the transmission-source user identification information 151 that has already been registered in the MFP 10, the acquisition unit 14** determines that the client user of the print job is the same as the transmission source user of the extensible authentication information.

In step S17, it is also determined on the basis of the client user identification information 152 and the user-authorized-to-spooling identification information already registered in the MFP 10 whether or not the client user is a user who is authorized to spooling. More specifically, it is determined whether or not the client user identification information (the MAC address of the external terminal 50) 152 is the same as the user-authorized-to-spooling identification information (the MAC address of the external terminal 50) already registered in the MFP 10. Here, it is determined that the same MAC address as the MAC address acquired at the time of reception of the print job (the MAC address "-----01" of the external terminal 50 of the user U1) is already registered in the MFP 10. When the client user identification information 152 is determined to be the same as the user-authorized-to-spooling identification information already registered in the MFP 10**, the client user is determined to be a user authorized to spooling.

In step S18, when the client user is determined to be a user who is authorized to spooling, the MFP 10 (job control unit 16) authorizes spooling of the print job received in step S15 from the external terminal 50. In other words, when the client user is determined to be a user authorized to spooling, the MFP 10 regards the print job received from the external terminal 50 as a print job (job authorized to be spooled) from the user authorized to spooling and authorizes the spooling of the print job. The print job authorized to be spooled is (temporarily) spooled in the storage unit 5 of the MFP 10 (prior to user authentication for printing that involves extensible authentication). In this way, when the MAC address acquired at the time of reception of the print job is the same as the MAC address already registered in the MFP 10, the print job received from the external terminal 50 is once accepted and spooled in the MFP 10 without being discarded, regardless of the presence or absence of the authentication information.

In step S19(19A), when the transmission-source user is determined to be the same as the client user in step S17, the MFP 10 (identification unit 17) identifies the extensible authentication information received from the external terminal 50 (extensible authentication information associated with the transmission-source user identification information 151 already registered in the MFP 10) as information to be used for extensible authentication. More specifically, the extensible authentication information (user ID, user password, department ID, and department password) that is registered in association with the MAC address ("----**-01") acquired in step S13 is identified as information to be used for user authentication for printing that involves extensible authentication.

Then, the MFP 10 (transmission unit 4a) transmits the extensible authentication information, which has been identified on the basis of the transmission-source user identification information (MAC address) 151 already registered in the MFP 10, to the authentication server 90 (step S20). When transmitting the extensible authentication information, the MFP 10 also transmits a command to start user authentication (user authentication start command) to the authentication server 90.

Upon receiving the extensible authentication information and the user authentication start command from the MFP 10, the authentication server 90 executes user authentication processing (extensible authentication processing) using the extensible authentication information (step S21). More specifically, the authentication server 90 checks the extensible authentication information received from the MFP 10 against extensible authentication information registered in the authentication database (not shown) of the authentication server 90. As described above, the authentication database stores extensible authentication information (here, user IDs, user passwords, department IDs, and department passwords) that is registered in advance for each user who uses the external terminal 50 and the MFP 10.

After the user authentication processing is completed, the authentication server 90 transmits the result (authentication result) of the user authentication processing to the MFP 10 (step S22). For example, when the extensible authentication information received from the MFP 10 matches extensible authentication information registered in the authentication database, the authentication server 90 transmits the authentication result indicating the success of the user authentication to the MFP 10. When the extensible authentication information received from the MFP 10 does not match any extensible authentication information registered in the authentication database, the authentication server 90 transmits the authentication result indicating the failure of the user authentication to the MFP 10. In the present example, the extensible authentication information (user ID, user password, department ID, and department password) of the user U1 is assumed to be registered in advance in the authentication database, and the authentication result indicating the success of the user authentication is transmitted from the authentication server 90 to the MFP 10.

When the user has been successfully authenticated (the authentication result indicating the success of the user authentication is received from the authentication server 90), the MFP 10 (job control unit 16) executes the print job spooled in the storage unit 5 (print job received from the external terminal 50 in step S15) (step S23).

When the authentication result indicating the failure of the user authentication is received from the authentication server 90, the MFP 10 transmits a notification that indicates the failure of the user authentication and prompts for confirmation of the authentication information to the external terminal 50. In response to the notification, the external terminal 50 displays an indication that notifies the user of the failure of the user authentication and prompts the user to confirm the authentication information on the touch panel 75 of the external terminal 50.

As described above, through the operations according to the first embodiment, the MFP 10 acquires the transmission-source user identification information 151 for identifying a transmission source user of authentication information at the time of reception of the authentication information, and also acquires the client user identification information 152 for identifying a client user of a print job at the time of reception of the print job. Then, when it is determined on the basis of the transmission-source user identification information 151 and the client user identification information 152 that the transmission source user is the same as the client user, the MFP 10 identifies the authentication information received from the external terminal 50 as information to be used for user authentication for printing that involves authentication. It is thus possible to prevent the authentication from ending in failure due to a lack of authentication information.

For conventional printing that involves authentication (user authentication), a print job received from the external terminal 50 is once spooled on condition that the user has been successfully authenticated. In other words, the print job received from the external terminal 50 is not spooled in the MFP 10 until the user has been successfully authenticated. Thus, there are cases where the user cannot transmit a print job to the MFP 10 until authorized, which may prevent smooth execution of the print job.

In contrast, through the operations according to the first embodiment the spooling of a print job received from the external terminal 50 is authorized when the client user of the print job is determined to be a user authorized to spooling, on the basis of the client user identification information 152 and the user-authorized-to-spooling identification information. Accordingly, the MFP 10 can authorize the (temporary) spooling of a print job received from the external terminal 50, regardless of whether the user is successfully authorized or not (regardless of the presence or absence of the authentication information required for user authentication), and therefore, can smoothly execute the print job.

2. Second Embodiment

A second embodiment is a variation of the first embodiment. The following description mainly focuses on differences from the first embodiment.

The first embodiment takes the example of the form in which the transmission-source user identification information 151 and the client user identification information 152 are each an identifier (MAC address) that is unique to the external terminal 50 of a user.

The second embodiment takes the example of a form in which the transmission-source user identification information 151 and the client user identification information 152 are each user identification information (user ID) of a user of the external terminal 50. More specifically, in the second embodiment, the user ID (user name) out of the two input items (user ID and password) that can be input with the standard printing software 101 is used as the transmission-source user identification information 151 and the client user identification information 152.

In the second embodiment, the steps in FIG. 4 are also performed in the same manner as in the first embodiment.

It is, however, noted that the content of processing performed in steps S13 to S16 of the second embodiment is different from that in steps S13 to S16 of the first embodiment.

More specifically, in step S13 of the second embodiment, the MFP 10 (acquisition unit 14) acquires the user ID inputted (set) on the user information input screen 200(202) (see FIG. 5) by a user (user U1) as the transmission-source user identification information 151 (step S13).

FIG. 7 illustrates an authentication information management table 300(302) according to the second embodiment. Here, users ID are registered as extensible authentication information necessary for extensible authentication and are also registered as the transmission-source user identification information 151 for identifying a transmission source user of extensible authentication information. As illustrated in FIG. 7, the transmission-source user identification information (user ID "User U1") 151 acquired in step S13 and extensible authentication information (authentication information including the user ID) are registered in association with each other in the authentication information management table 300(302) (step S14).

Figure 8:
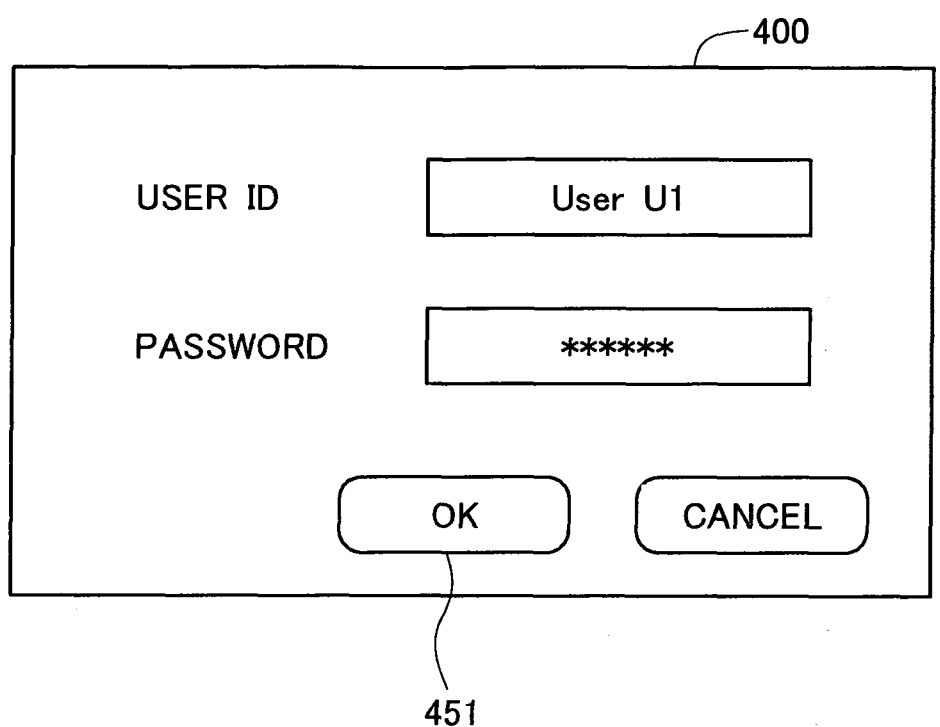
FIG. 8 illustrates a standard authentication screen for standard authentication.

Thereafter, for transmission of a print job (step S15), the external terminal 50 requires the user (user U1) to input standard authentication information (user ID and password) by using the standard printing software 101. FIG. 8 illustrates a standard authentication screen 400 for standard authentication. When the user (user U1) gives an instruction to execute a print job by using the standard printing software 101, the standard authentication screen 400 is displayed on the touch panel 75 of the external terminal 50. The external terminal 50 (input control unit 62) receives input of a user ID and password from the user (user U1) on the standard authentication screen 400. Here, the same user ID ("User U1") as the user ID used for extensible authentication is assumed to be inputted (set) in a user-ID entry field of the standard authentication screen 400. Then, when an OK button 451 is pressed, the external terminal 50 transmits the standard authentication information (user ID and password that are inputted on the standard authentication screen 400) together with the print job to the MFP 10.

Upon receiving the print job and the standard authentication information (user ID and password) from the external terminal 50, the MFP 10 (the reception unit 4b and the acquisition unit 14) acquires the client user identification information (user ID) 152 (step S16). More specifically, the user ID ("User U1") is acquired from among the standard authentication information received from the external terminal 50.

Note that processing in step S17 onward is performed in the same manner as in the above-described first embodiment. For example, in step S19, when the transmission-source user and the client user are determined to be the same on the basis of the transmission-source user identification information (user ID) 151 and the client user identification information (user ID) 152, extensible authentication information that is registered in association with the transmission-source user identification information 151 is identified as information to be used for extensible authentication.

This form can achieve similar effects to those of the above-described first embodiment.

While the second embodiment takes the example of the form in which, for the transmission of a print job, the standard authentication screen 400 is displayed on the touch panel 75 of the external terminal 50, and standard authentication information inputted on the standard authentication screen 400 by a user is transmitted from the external terminal 50 to the MFP 10, the present invention is not limited to this form. For example, a form is also possible in which standard authentication information (user ID and password) is registered in advance in the external terminal 50 by a user, and the standard authentication information already registered in the external terminal 50 is automatically transmitted at the time of transmission of a print job.

3. Third Embodiment

A third embodiment is a variation of the first embodiment. The following description mainly focuses on differences from the first embodiment.

The third embodiment takes the example of a form in which the transmission-source user identification information 151 and the client user identification information 152 are e-mail addresses (also simply referred to as "mail addresses") of a user of the external terminal 50.

In the third embodiment, the external terminal 50 transmits an e-mail with a print target file attached to the MFP 10, and the MFP 10 that has received the e-mail prints the file (print target file) attached to the e-mail. Such printing using e-mails is also referred to as "E-mail to Print." The user can cause the MFP 10 to print a print target file by attaching the print target file to an e-mail and sending the e-mail to the mail address of the MFP 10. In this case, for example, even if a printer driver for the MFP 10 is not installed in the external terminal 50, the user is able to cause the MFP 10 to execute the printing of a print target file, by using the external terminal 50.

The third embodiment takes the example of the form in which the idea of the first embodiment is applied to "E-mail to Print."

In the third embodiment, the steps in FIG. 4 are also performed in the same manner as in the first embodiment.

It is, however, noted that the content of processing performed in steps S11 to S16 of the third embodiment is different from that in steps S11 to S16 of the first embodiment.

More specifically, in step S11 of the third embodiment, the MFP 10 (input control unit 62) also receives input of a mail address through input of an operation to a user information input screen 200(202) (see FIG. 9). FIG. 9 illustrates the user information input screen 200(202) according to the third embodiment. As illustrated in FIG. 9, the user information input screen 200(202) also displays a mail address (mail address of the user (user U1) of the external terminal 50) as an input item, in addition to the extensible authentication information (user ID, user password, department ID, and department password). The input control unit 62 thus also receives input of a mail address ("user-u1@***.jp") through input of an operation to the user information input screen 202.

In step S12, the external terminal 50 transmits the user information (extensible authentication information and mail address) inputted on, the user information input screen 200(202) to the MFP 10.

Upon receiving the user information, the MFP 10 (the reception unit 4b and the acquisition unit 14) acquires the transmission-source user identification information 151 (here, the mail address inputted on the user information input screen 200(202) (see FIG. 9) by the user) (step S13).

FIG. 10 illustrates an authentication information management table 300(303) according to the third embodiment. As illustrated in FIG. 10, the transmission-source user identification information ¥151 (the mail address "user-u1@*.jp" of the user U1) acquired in step S13 and the extensible authentication information are registered in association with each other in the authentication information management table 300(303)** (step S14).

Then, in step S15, the external terminal 50 transmits an e-mail with a print target file attached as a print job to the MFP 10 (the mail address of the MFP 10). Note that the external terminal 50 knows in advance the mail address of the MFP 10.

Upon receiving the e-mail as a print job from the external terminal 50, the MFP 10 (the reception unit 4b and the acquisition unit 14) acquires the attached file (print target file) and acquires the client user identification information (e-mail address) 152 (step S16). More specifically, the mail address of the transmission source of the e-mail (the mail address "user-u1@***.jp" of the user U1) is acquired.

Processing in step S17 onward is performed in the same manner as in the above-described first embodiment. For example, in step S19, when the transmission-source user and the client user are determined to be the same on the basis of the transmission-source user identification information (mail address) 151 and the client user identification information (e-mail address) 152, the extensible authentication information that is registered in association with the transmission-source user identification information 151 is identified as information to be used for extensible authentication.

This form achieves similar effects to those of the above-described first embodiment.

4. Fourth Embodiment

A fourth embodiment is a variation of the first embodiment. The following description mainly focuses on differences from the first embodiment.

The first embodiment takes the example of the form in which the spooled print job is (immediately) executed when the user authentication for printing that involves extensible authentication has succeeded.

The fourth embodiment takes the example of a form in which the spooled print job is executed when the user authentication for printing that involves extensible authentication has succeeded and also execution of the print job is permitted.

The fourth embodiment adopts authentication printing using short-distance wireless communication such as near field communication (NFC).

In the authentication printing using NFC, a user transmits a print job to the MFP 10 by using the external terminal 50, then travels to the location where the MFP 10 is installed, and holds (brings) the user's external terminal 50 (external terminal 50 with a built-in NFC chip capable of controlling procedures such as establishment of communication and transmission and reception of various types of data) over (close to) the authentication device 30. When the external terminal 50 is brought close to an authentication device (NFC reader) of the MFP 10 (when the external terminal 50 approaches within a predetermined range of distances from the authentication device), NFC communication is established between the MFP 10 and the external terminal 50. When the NFC communication is established, the MFP 10 executes the print job received from the external terminal 50. In this case, the user can start the printing of printed matter, which the user may not want others to see, after the user has arrived at the location where the MFP 10 is installed. Thus, high-security authentication printing becomes possible. The authentication printing using short-distance wireless communication such as NFC described above is also referred to as "Touch and Print."

In the fourth embodiment, the execution of a spooled print job is permitted on condition that short-distance wireless communication such as NFC is established.

Figure 11:
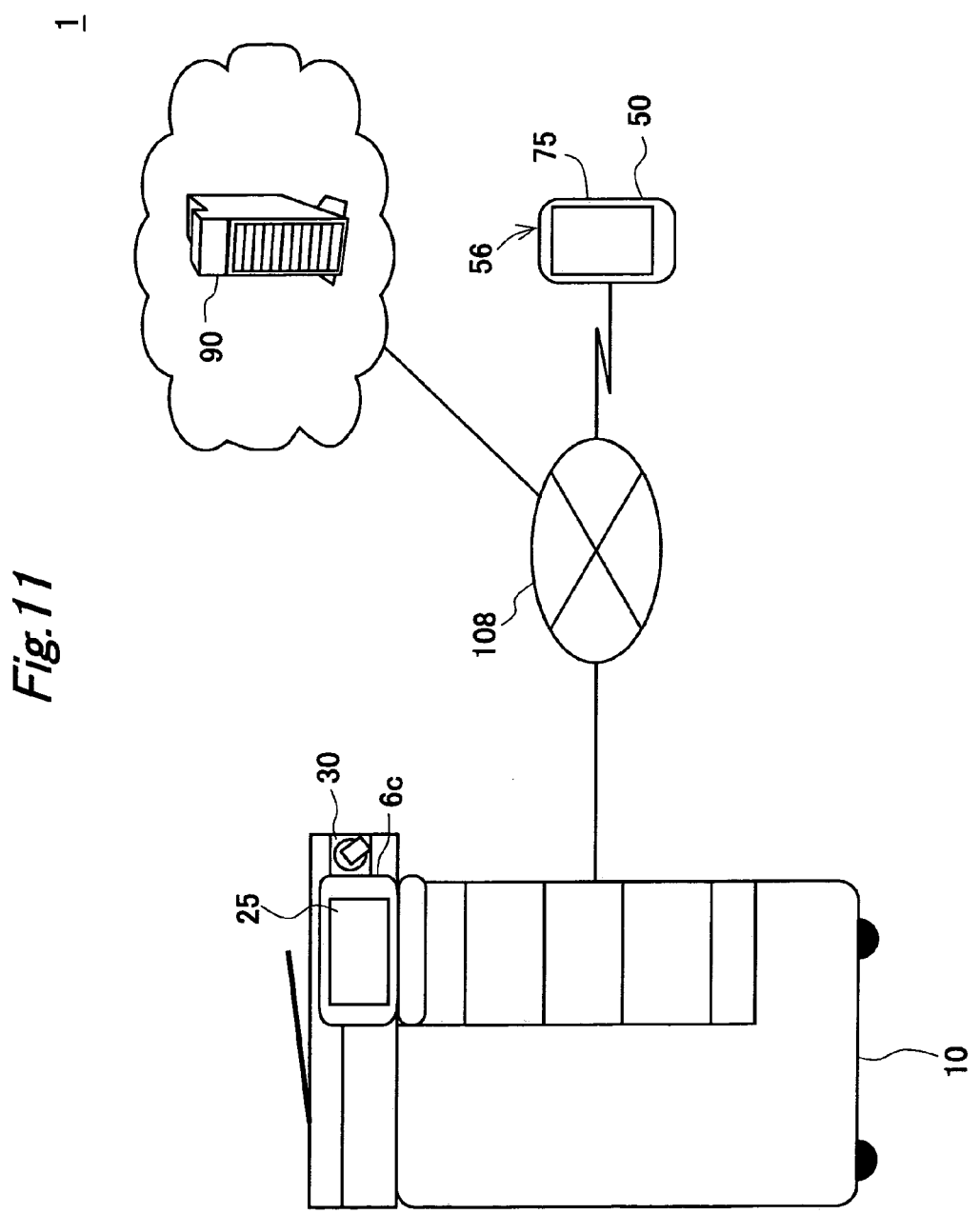
FIG. 11 illustrates a printing system according to a fourth embodiment.

FIG. 11 illustrates a printing system 1 according to the fourth embodiment. As illustrated in FIG. 11, the authentication device (NFC reader) 30 is attached to the MFP 10 (around the operation panel unit 6c) in the fourth embodiment. The MFP 10 (authentication device 30) and the external terminal 50 each have an NFC chip with built-in programs such as a communication control program for controlling the establishment of communication and the transmission and reception of various types of data.

Figure 12:
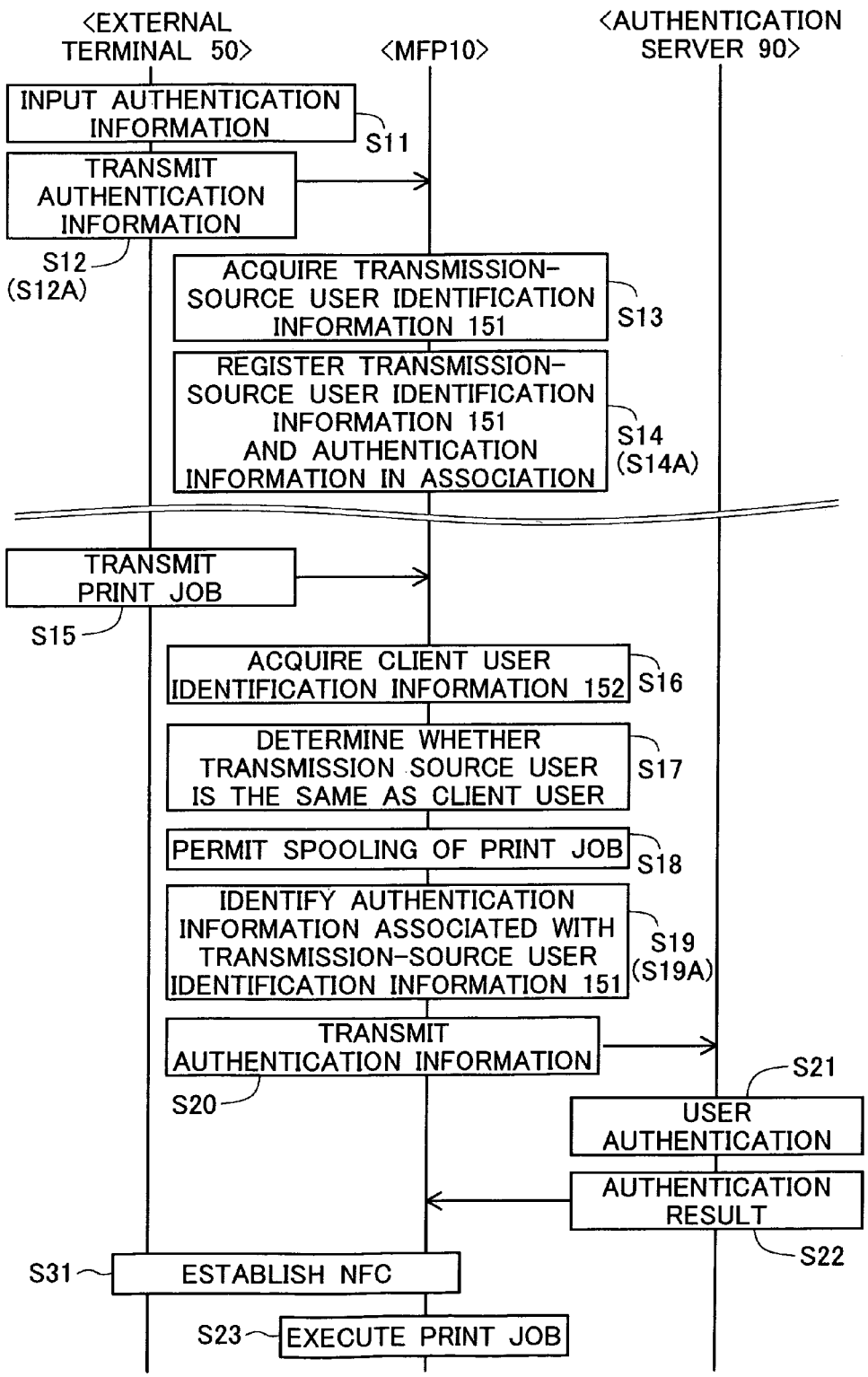
FIG. 12 is a timing chart illustrating an example of operations performed by the printing system of the fourth embodiment.

FIG. 12 is a timing chart illustrating an example of operations performed by the printing system 1 according to the fourth embodiment. As illustrated in FIG. 12, processing in step S31 is performed between steps S22 and S23, in addition to similar processes to those in steps S11 to S23 in FIG. 4. Also, the detailed content of processing performed in steps S11 and S12 in the fourth embodiment is different from that in steps S11 and S12 of the first embodiment.

More specifically, in step S11 of the fourth embodiment, a user information input screen 200(203) (see FIG. 13) is displayed on the touch panel 75 of the external terminal 50. FIG. 13 illustrates the user information input screen 200 (203) according to the fourth embodiment. As illustrated in FIG. 13, the user information input screen 200 (203) also displays an option that indicates whether or not to use "Touch and Print," in addition to the extensible authentication information (here, user ID, user password, department ID, and department password). When the user wants to use "Touch and Print," the user adds a check to a checkbox for the option saying "Use Touch and Print" by, for example, clicking the checkbox (see FIG. 13).

Then, when the SET button 251 is pressed, in step S12, the extensible authentication information inputted on the user information input screen 200(203) and information that instructs the use of "Touch and Print" are transmitted from the external terminal 50 to the MFP 10. In response to the instruction to use "Touch and Print," the external terminal 50 also transmits a standby command, which will be described below, to the MFP 10 in step S12. The standby command is a command to wait for execution of a print job until the extensible authentication has succeeded and the execution of the print job is permitted. To be more specific, the standby command is an instruction to wait for execution of a print job (spooled print job) until the authentication result indicating the success of the user authentication for printing that involves extensible authentication is received from the authentication server 90 and short-distance wireless communication (here, NFC) is established between the MFP 10 and the external terminal 50. Upon receiving the standby command, the MFP 10 (job control unit 16) waits for execution of the spooled print job until the authentication result indicating the success of the user authentication is received from the authentication server 90 and NFC is established.

The procedure then goes through steps S15 to S21, and the MFP 10 (job control unit 16) does not execute the print job (spooled print job) even when the authentication result indicating the success of the extensible authentication is received from the authentication server 90 (step S22), and waits for execution of the print job until the execution of the print job is permitted.

After having transmitted the print job to the MFP 10 by using the external terminal 50, the user travels to the location where the MFP 10 is installed and holds (brings) the user's external terminal 50 over (close to) the authentication device 30. When the external terminal 50 is brought close to the authentication device 30, NFC is established between the MFP 10 and the external terminal 50 (step S31). When the NFC is established, the external terminal 50 transmits an instruction to start execution of a job to the MFP 10. In response to the instruction to start execution of a job, the MFP 10 (job control unit 16) executes the print job spooled in the storage unit 5 (step S23). In this way, the execution of the spooled print job is permitted on condition that NFC is established between the MFP 10 and the external terminal 50. Note that the instruction to start execution of a job may be transmitted via the network 108 (e.g., a wireless LAN) from the MFP 10 to the external terminal 50, or may be transmitted via NFC from the MFP 10 to the external terminal 50.

This form achieves similar effects to those of the above-described first embodiment.

5. Fifth Embodiment

A fifth embodiment is a variation of the first embodiment. The following description mainly focuses on differences from the first embodiment.

In the first embodiment, all extensible authentication information required for extensible authentication is registered in advance in the MFP 10 (step S14A (see FIG. 4)).

In this case, security problems may arise such as unauthorized access from individuals other than a user due to a leak of the user's ID and password, because not only the user ID but also the user password are registered in other devices (e.g., MFP 10) besides the user's external terminal 50 and continues to be stored in those devices.

In view of this, in the fifth embodiment, only part (user ID and department ID) of the extensible authentication information excluding passwords (user password and department password) are registered in advance in the MFP 10. The passwords (user password and department password) are transmitted after the transmission of a print job from the external terminal 50 to the MFP 10.

In the fifth embodiment, the authentication device (NFC reader) 30 is attached to the MFP 10 as in the above-described fourth embodiment (see FIG. 11). The MFP 10 and the external terminal 50 each have an NFC chip.

Figure 14:
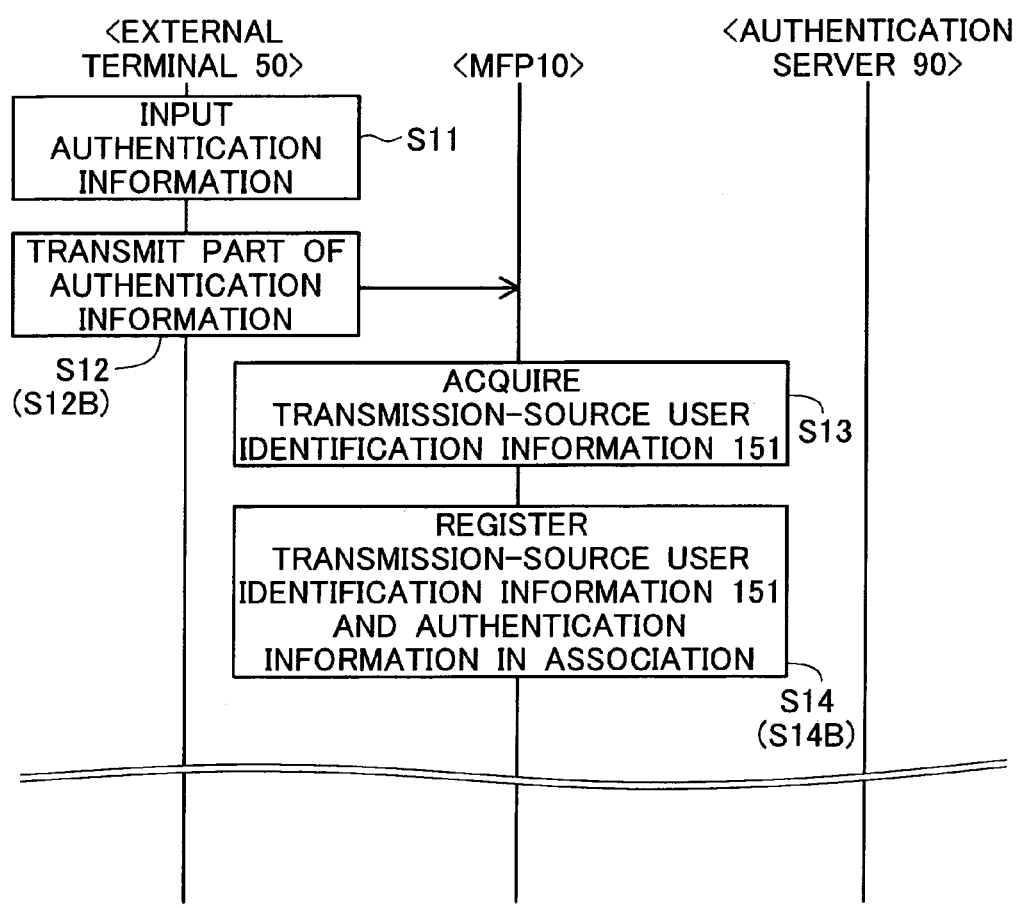
FIG. 14 is a timing chart illustrating an example of operations performed by a printing system according to a fifth embodiment.
Figure 15:
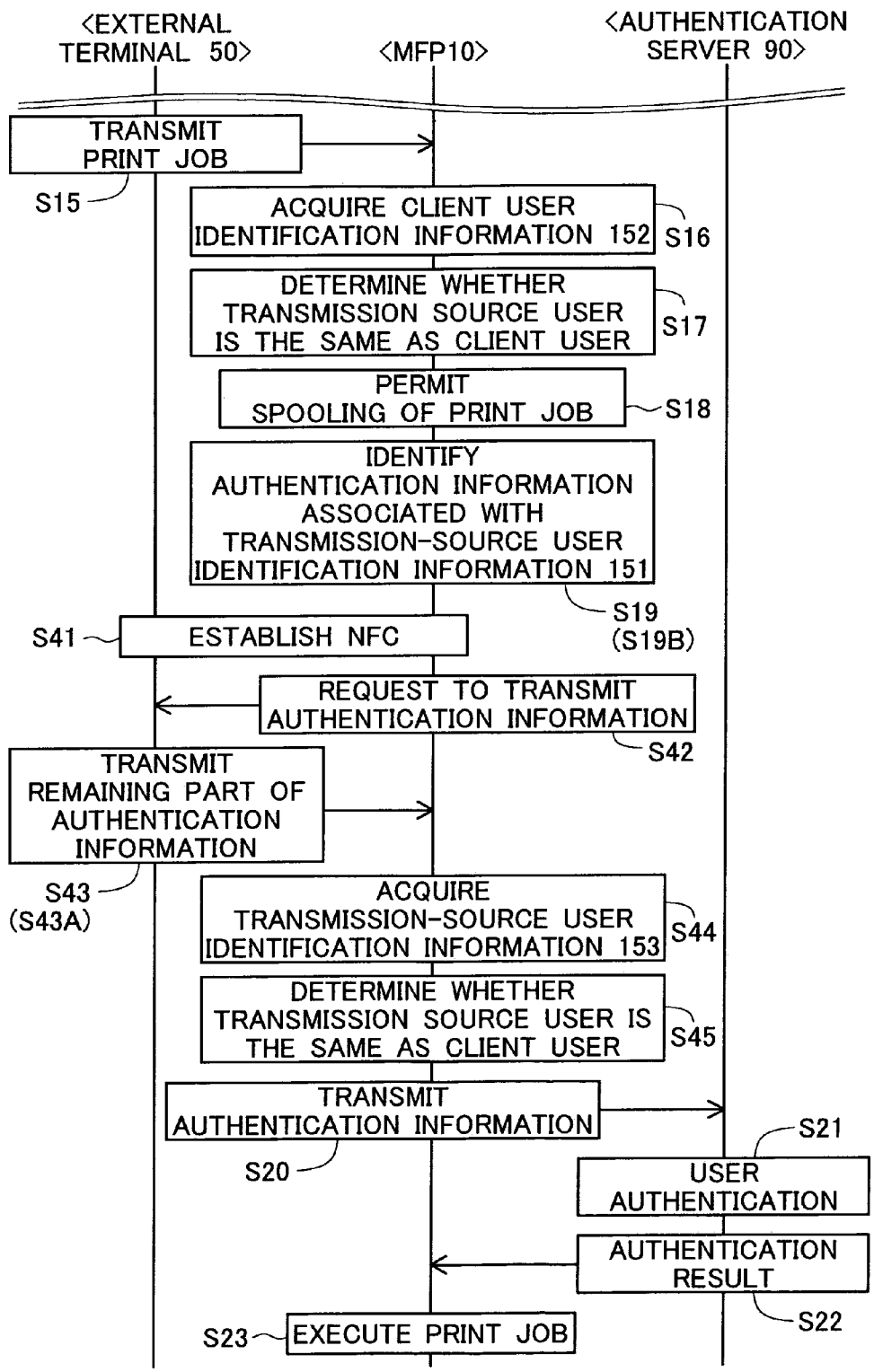
FIG. 15 is a timing chart illustrating an example of operations performed by the printing system of the fifth embodiment.

FIGS. 14 and 15 are timing charts illustrating an example of operations performed by a printing system 1 according to the fifth embodiment. The content of processing performed in steps S12, S14, and S19 of the fifth embodiment is different from that in steps S12, S14, and S19 of the first embodiment. As illustrated in FIG. 15, processing in steps S41 to S45 is performed between steps S19 and S20 in FIG. 4.

FIG. 16 illustrates a user information input screen 200 (204) according to the fifth embodiment. In step S11 of the fifth embodiment, the user information input screen 200 (204) is displayed on the touch panel 75 of the external terminal 50. More specifically, the user information input screen 200(204) displays an option that indicates whether or not to use "Touch and Print" and an option that indicates whether or not to register passwords in the MFP 10, in addition to the extensible authentication information (here, user ID, user password, department ID, and department password), as illustrated in FIG. 16. When the user wants to not register passwords in the MFP 10 (authentication information management table 300), the user adds a check to a checkbox for the option saying "Do Not Register Passwords in MFP 10" by, for example, clicking the checkbox. When the checkbox for the option saying "Do Not Register Passwords in MFP 10" is checked, the external terminal 50 determines not to transmit passwords (user password and department password) in the extensible authentication information to the MFP 10. Note that when the checkbox for the option saying "Do Not Register Passwords in MFP 10" is checked, a check is (automatically) added to the checkbox for the option saying "Use Touch and Print."

Then, when the SET button 251 is pressed, it is confirmed that the passwords are not registered in the MFP 10, and the external terminal 50 transmits part (user ID and department ID) of the extensible authentication information to the MFP 10 (step S12(S12B)). At this point in time (in step S12B), passwords (user password and department password) are not transmitted from the external terminal 50 to the MFP 10.

Upon receiving the part of the information from the external terminal 50, the MFP 10 (acquisition unit 14) acquires the transmission-source user identification information (here, MAC address) 151 on the basis of the data received from the external terminal 50 (to be more specific, IP address included in the received data) (step S13).

The MFP 10 (registration processor 15) then registers the transmission-source user identification information (MAC address) 151 and the part of the information (user ID and department ID) in association with each other in an authentication information management table 300(304) (see FIG. 17) (step S14(S14B)). FIG. 17 illustrates the authentication information management table 300(304) according to the fifth embodiment. As illustrated in FIG. 17, the transmission-source user identification information (MAC address "----**-01") 151 and the part of the information (user ID and department ID) are registered in association with each other in the authentication information management table 300(304). The passwords (user password and department password) are not registered in the authentication information management table 300(304), as illustrated in FIG. 17, because they have not yet been received from the external terminal 50.

The procedure then goes through steps S15 to S18, and when the transmission-source user and the client user are determined to be the same, the part of the information (user ID and department ID) that is registered in association with the transmission-source user identification information (MAC address) 151 is identified in step S19(S19B).

Then, when the user's external terminal 50 is held (brought) over (close to) the authentication device 30, NFC is established between the MFP 10 and the external terminal 50 (step S41). When NFC is established, the MFP 10 transmits a request to transmit authentication information (hereinafter, "authentication information transmission request"), which will be described below, to the external terminal 50 via the network 108 (e.g., a wireless LAN) (step S42). The authentication information transmission request is a transmission request to transmit authentication information that is not registered in the authentication information management table 300(304) to the MFP 10. The MFP 10 identifies which pieces of the extensible authentication information are not registered in the MFP 10, on the basis of the identification of the part of the extensible authentication information required for extensible authentication in step S19B. The MFP 10 then transmits a transmission request to transmit unregistered information to the external terminal 50. In the present example, passwords (user password and department password) in the extensible authentication information (user ID, user password, department ID, and department password) are not registered in the authentication information management table 300(304). Thus, the MFP 10 transmits an authentication information transmission request to transmit the passwords (remaining part of the extensible authentication information) to the MFP 10, to the external terminal 50.

In response to a receipt of the authentication information transmission request from the MFP 10, the external terminal 50 (transmission unit 54a) transmits the remaining part of the extensible authentication information to the MFP 10 (step S43(S43A)). More specifically, the remaining information (user password and department password) excluding part (transmitted authentication information, i.e., user ID and department ID) of the extensible authentication information (user ID, user password, department ID, and department password) is transmitted from the external terminal 50 to the MFP 10. Here, note that the remaining information is transmitted via the network 108 (e.g., a wireless LAN) from the external terminal 50 to the MFP 10 in order to acquire transmission-source user identification information (MAC address of the external terminal 50) 153 as described below.

Upon receiving the remaining information (user ID and department password), the MFP 10 (the reception unit 4b and the acquisition unit 14) acquires the transmission-source user identification information (here, MAC address of the external terminal 50) 153 (step S44). More specifically, the MAC address of the external terminal 50 is acquired as the transmission-source user identification information 153 on the basis of the IP address included in the data received as the remaining information.

When the transmission-source user identification information 153 is acquired, the acquisition unit 14 determines, whether or not the transmission-source user is the same as the client user, on the basis of the transmission-source user identification information (MAC address) 153 and the client user identification information (MAC address) 152 (step S45). When the transmission-source user and the client user are determined to be the same, the MFP 10 (identification unit 17) identifies the part of information (user ID and department ID) registered in association with the transmission-source user identification information 151 and the remaining information (user password and department password) as information to be used for extensible authentication.

Then, the extensible authentication information is transmitted to the authentication server 90 (step S20). More specifically, the extensible authentication information (user ID, user password, department ID, and department password) obtained by combining the part of the information (user ID and department ID) identified in step S19B and the remaining information (user password and department password) received from the external terminal 50 in step S43A is transmitted from the MFP 10 to the authentication server 90. In other words, in response to receiving a complete set of the extensible authentication information, the MFP 10 transmits the extensible authentication information to the authentication server 90.

Note that the processing in step S21 onward is performed in the same manner as in the above-described first embodiment.

This form achieves similar effect to those of the above-described first embodiment.

6. Sixth Embodiment

A sixth embodiment is a variation of the fifth embodiment. The following description mainly focuses on differences from the fifth embodiment.

The fifth embodiment takes the example of the form in which part f the extensible authentication information received from the external terminal 50 is registered in advance in the MFP 10 (step S14B (see FIG. 14)), and the remaining information is transmitted after the transmission of a print job from the external terminal 50 to the MFP 10 (step S43A).

The sixth embodiment takes the example of a form in which none of the extensible authentication information is registered in the MFP 10, and the extensible authentication information is transmitted after the transmission of a print job from the external terminal 50 to the MFP 10 (step S43B, which will be described later).

Figure 18:
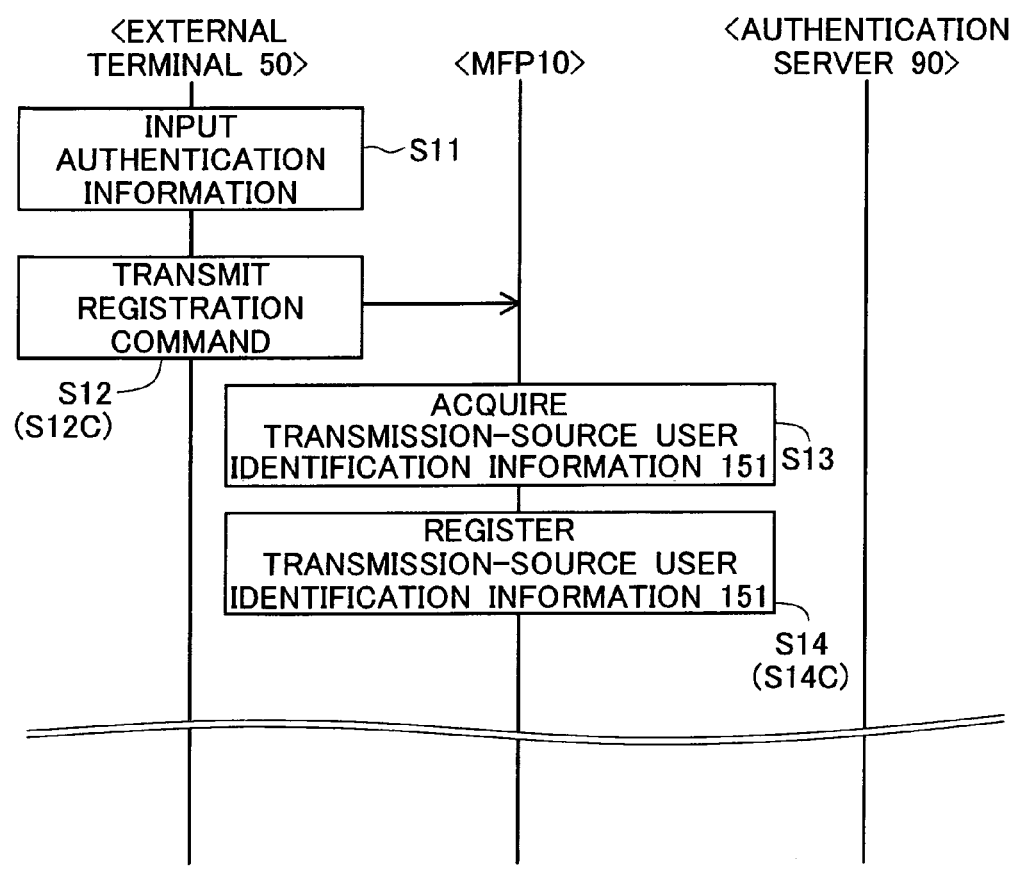
FIG. 18 is a timing chart illustrating an example of operations performed by a printing system according to a sixth embodiment.
Figure 19:
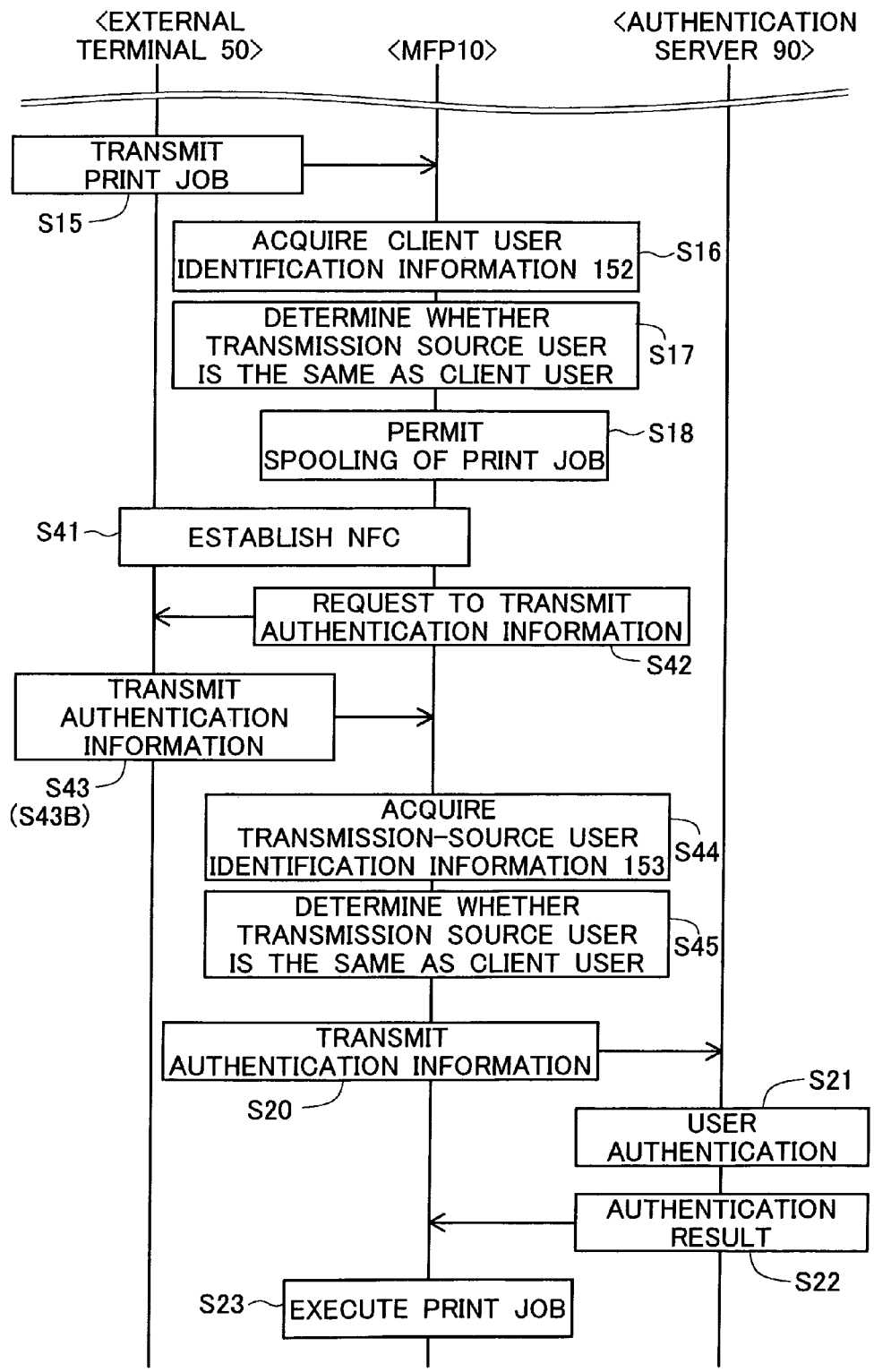
FIG. 19 is a timing chart illustrating an example of operations performed by the printing system of the sixth embodiment.

FIGS. 18 and 19 are timing charts illustrating an example of operations performed by a printing system 1 according to the sixth embodiment. The content of processing performed in steps S12, S14, and S43 of the sixth embodiment is different from that in steps S12, S14, and S43 of the fifth embodiment.

FIG. 20 illustrates a user information input screen 200 (205) according to the sixth embodiment. In step S11 of the sixth embodiment, the user information input screen 200 (205) is displayed on the touch panel 75 of the external terminal 50. More specifically, the user information input screen 200(205) displays an option that indicates whether or not to use "Touch and Print" and an option that indicates whether or not to register (all) authentication information in the MFP 10, as illustrated in FIG. 20, in addition to the extensible authentication information (user ID, user password, department ID, and department password). When the user wants to not register authentication information in the MFP 10 (authentication information management table 300), the user adds a check to a checkbox for the option saying "Do Not Register Authentication Information" by, for example, clicking the checkbox. When the checkbox for the option saying "Do Not Register Authentication Information" is checked, the external terminal 50 determines not to transmit the extensible authentication information to the MFP 10. Note that when the checkbox for the option saying "Do Not Register Authentication Information" is checked, a check is (automatically) added to the checkbox for the option saying "Use Touch and Print."

Then, when the SET button 251 is pressed, it is confirmed that the extensible authentication information is not registered in the MFP 10. At this point in time, the external terminal 50 does not transmit the extensible authentication information to the MFP 10 and transmits a registration command, which will be described below, to the MFP 10 (step S12(S12C)). The registration command is a command to register the transmission-source user identification information (here, the MAC address of the external terminal 50) 151 in the MFP 10.

Upon receiving the registration command, the acquisition unit 14 acquires the MAC address of the external terminal 50 on the basis of the data received as the registration command (to be more specific, the IP address included in the received data) (step S13), and the registration processor 15 registers the MAC address (alone) in the authentication information management table 300 (step S14(S14C)).

The procedure then goes through steps S15 to S18 and S41, and the MFP 10 transmits an authentication information transmission request to the external terminal 50 (step S42). Here, none of the extensible authentication information (user ID, user password, department ID, and department password) is registered in the MFP 10. Thus, the MFP 10 transmits a transmission request to transmit all of the extensible authentication information to the MFP 10, to the external terminal 50. In response to a receipt of the authentication information transmission request, the external terminal 50 (transmission unit 54*a*) transmits the extensible authentication information (user ID, user password, department ID, and department password), which is not registered in the MFP 10, to the MFP 10 (step S43 (S43B)). Here, note that the extensible authentication information is transmitted via the network 108 (e.g., a wireless LAN) from the external terminal 50 to the MFP 10.

Upon receiving the extensible authentication information (user ID, user password, department ID, and department password), the MFP 10 (the reception unit 4*b* and the acquisition unit 14) acquires the transmission-source user identification information (here, the MAC address of the external terminal 50) 153 (step S44). More specifically, the MAC address of the external terminal 50 is acquired as the transmission-source user identification information 153 on the basis of the IP address included in the data received as the extensible authentication information.

When the transmission-source user identification information 153 is acquired, it is determined on the basis of the transmission-source user identification information (MAC address) 153 and the client user identification information (MAC address) 152 whether or not the transmission-source user is the same as the client user (step S45). When the client user and the transmission-source user are determined to be the same, the extensible authentication information received from the external terminal 50 is identified as information to be used for user authentication in printing that involves extensible authentication. Then, the extensible authentication information, which is received after the reception of the print job from the external terminal 50 (to be more specific, extensible authentication information received after the establishment of NFC (step S41) from the external terminal 50), is transmitted to the authentication server 90 (step S20).

Note that the processing in step S21 onward is performed in the same manner as in the above-described fifth embodiment (first embodiment).

This form achieves similar effects to those of the above-described fifth embodiment (first embodiment).

7. Variations

While the above has been a description of embodiments of the present invention, the present invention is not intended to be limited to the above-described embodiments.

For example, while the above-described embodiments take the examples of the form in which a single piece (e.g., MAC address) of the transmission-source user identification information 151 is registered in the MFP 10 (authentication information management table 300), the present invention is not limited to this form, and a plurality of pieces (e.g., MAC address and mail address) of transmission-source user identification information may be registered in the MFP 10.

More specifically, when a plurality of pieces (e.g., MAC address and mail address) of transmission-source user identification information are registered in the MFP 10, the authentication information management table 300 stores the respective pieces of transmission-source user identification information 151 that are each registered in association with extensible authentication information. Then, the extensible authentication information that is registered in association with the transmission-source user identification information 151 is identified on the basis of the client user identification information 152 that is acquired at the time of reception of a print job. For example, when the MAC address of the external terminal 50 is acquired as the client user identification information 152 at the time of reception of a print job, the extensible authentication information that is registered in association with the transmission-source user identification information (in this case, MAC address) 151 is identified. Also, for example, when the mail address is acquired as the client user identification information 152 at the time of reception of a print job, the extensible authentication information that is registered in association with the transmission-source user identification information (in this case, mail address) is identified. In this way, a plurality of pieces of the transmission-source user identification information 151 may be registered in the MFP 10.

The above-described first to fifth embodiments take the examples of the form in which, when the SET button 251 is pressed on the user information input screen 200 (see, for example, FIG. 5) during the process of registering extensible authentication information, the extensible authentication information is (manually) transmitted from the external terminal 50 to the MFP 10 (step S12; see, for example, FIG. 4), the present invention is not limited to this form.

For example, the extensible authentication information may be (automatically) transmitted from the external terminal 50 to the MFP 10 after NFC communication is established between the MFP 10 and the external terminal 50. More specifically, NFC communication is established when the user has inputted information such as extensible authentication information on the user information input screen 200 (step S11), then has traveled to the location where the MFP 10 is installed, and then has hold (brought) the user's external terminal 50 over (close to) the authentication device 30. When the NFC communication is established, an authentication information transmission request is transmitted from the MFP 10 to the external terminal 50, and in response to the authentication information transmission request, the extensible authentication information is automatically transmitted from the external terminal 50 to the MFP 10.

The above-described fifth and sixth embodiments take the examples of the form in which, after the establishment of NFC (step S41), the remaining information excluding part of the extensible authentication information (or all of the extensible authentication information) is transmitted "via the network 108 (e.g., a wireless LAN)" from the external terminal 50 to the MFP 10. The present invention is, however, not limited to this form, and for example, a form is possible in which, in cases such as where the user ID is acquired as the client user identification information 152 and the transmission-source user identification information 151 and 153, the remaining information (or all information) is transmitted "via short-distance wireless communication such as an NFC" from the external terminal 50 to the MFP 10. When the remaining information (or all information) is transmitted via short-distance wireless communication from the external terminal 50 to the MFP 10, whether or not the transmission-source user is the same as the client user may be determined on the basis of the user ID acquired via the short-distance wireless communication and the user ID included in the extensible authentication information.

While the above-described embodiments take the examples of the form in which the authentication server 90 executes user authentication processing in printing that involves extensible authentication, the present invention is not limited to this form, and user authentication processing in printing that involves extensible authentication may be executed by the MFP 10.

While the above-described embodiments take the examples of the form in which the invention of the present application is applied to the case where the standard printing software 101 of the external terminal 50 cannot collect a complete set of authentication information required for extensible authentication, the present invention is not limited to this form. For example, the invention of the present application is also applicable to cases such as where another application different from the standard printing software 101 of the external terminal 50 is provided by, for example, a third vendor and fails to collect a complete set of authentication information required for extensible authentication. In other words, the invention of the present application is also applicable to cases such as where a program other than the standard printing software 101 of the external terminal 50 cannot collect a complete set of authentication information required for extensible authentication.

While the above-described embodiments take the examples of the form in which the invention of the present application is applied to the case where the external terminal 50 cannot collect a complete set of authentication information required for extensible authentication, the present invention is not limited to this form, and for example, the invention of the present application may be applied to cases such as where the external terminal 50 cannot collect a complete set of authentication information required for standard authentication. For example, the invention of the present application is also applicable to cases such as where an application (application with a print function) different from the standard printing software 101 cannot even receive input of the authentication information required for standard authentication. More specifically, when the different application is used at the time of transmission of a print job, the authentication information required for standard authentication may be transmitted from the external terminal 50 to the MFP 10 at a time different from the time of transmission of the print job by using the authentication information registration application 102.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A printing system comprising:
a printout apparatus that performs printing involving authentication; and
an external terminal capable of communication with the printout apparatus,
the external terminal including:
a transmission unit that transmits a print job to the printout apparatus at a time of transmission of the print job, and transmits authentication information to the printout apparatus at a time of transmission of the authentication information which is different from the time of transmission of the print job, the authentication information being required for user authentication in printing that involves the authentication, and
the printout apparatus including:
a communication unit that receives the print job from the external terminal at a time of reception of the print job, and receives the authentication information from the external terminal at a time of reception of the authentication information which is different from the time of reception of the print job;
an acquisition unit that acquires transmission-source user identification information for identifying a transmission source user of the authentication information when the authentication information is received from the external terminal, and acquires client user identification information for identifying a client user of the print job when the print job is received from the external terminal; and
an identification unit that identifies the authentication information received from the external terminal as information to be used for the user authentication when the transmission source user and the client user are determined to be the same on the basis of the transmission-source user identification information and the client user identification information.

2. The printing system according to claim 1, wherein
the printout apparatus further includes:
a registration processor that, prior to the reception of the print job, registers user-authorized-to-spooling identification information for identifying a user authorized to spooling, in advance in the printout apparatus; and
a job control unit that permits spooling of the print job when the client user is determined to be the user authorized to spooling on the basis of the client user identification information acquired at the time of reception of the print job and the user-authorized-to-spooling identification information registered in the printout apparatus.

3. The printing system according to claim 1, wherein
the transmission unit of the external terminal transmits the authentication information to the printout apparatus prior to the transmission of the print job,
the acquisition unit of the printout apparatus acquires the transmission-source user identification information at the time of reception of the authentication information,
the printout apparatus further includes:
a registration processor that registers the transmission-source user identification information and the authentication information in association with each other in the printout apparatus when the authentication information is received from the external terminal and the transmission-source user identification information is acquired, and
the identification unit of the printout apparatus identifies the authentication information that is associated with the transmission-source user identification information registered in the printout apparatus as information to be used for the user authentication, when the client user and the transmission source user are determined to be the same on the basis of the client user identification information acquired at the time of reception of the print job and the transmission-source user identification information registered in the printout apparatus.

4. The printing system according to claim 3, wherein
the printout apparatus further includes:
a job control unit that executes the print job when the user authentication that is executed using the authentication information identified by the identification unit has succeeded.

5. The printing system according to claim 4, wherein
the transmission unit of the external terminal transmits a standby command to the printout apparatus at the time of transmission of the print job, the standby command being a command to wait for execution of the print job until the user authentication succeeds and the execution of the print job is permitted, and
the job control unit of the printout apparatus executes the print job when the user authentication has succeeded and the execution of the print job is permitted.

6. The printing system according to claim 5, wherein
the execution of the print job is permitted on condition that short-distance wireless communication is established between the printout apparatus and the external terminal.

7. The printing system according to claim 1, wherein
the transmission unit of the external terminal transmits part of the authentication information to the printout apparatus prior to the transmission of the print job,
the acquisition unit of the printout apparatus acquires the transmission-source user identification information when the part of the authentication information is received,
the printout apparatus further includes:
a registration processor that registers the transmission-source user identification information and the part of the authentication information in association with each other in the printout apparatus, when the part of the authentication information has been received from the external terminal and the transmission-source user identification information has been acquired,
the transmission unit of the external terminal transmits remaining part of the authentication information, excluding the part of the authentication information, to the printout apparatus after the transmission of the print job, and
the identification unit of the printout apparatus identifies the part of the authentication information that is associated with the transmission-source user identification information registered in the printout apparatus and the remaining part of the authentication information as information to be used for the user authentication, when the client user and the transmission source user are determined to be the same on the basis of the client user identification information acquired at the time of reception of the print job and the transmission-source user identification information registered in the printout apparatus.

8. The printing system according to claim 7, wherein
the transmission unit of the external terminal transmits the remaining part of the authentication information to the printout apparatus when short-distance wireless communication is established between the printout apparatus and the external terminal after the transmission of the print job.

9. The printing system according to claim 7, wherein
the printout apparatus further includes:
a job control unit that executes the print job when the user authentication that is executed using the authentication information has succeeded, the authentication information being obtained by combining the part of the authentication information identified by the identification unit and the remaining part of the authentication information.

10. The printing system according to claim 1, wherein
the transmission unit of the external terminal transmits the authentication information to the printout apparatus after the transmission of the print job, and
the identification unit of the printout apparatus identifies the authentication information received from the external terminal as information to be used for the user authentication, when the client user and the transmission source user are determined to be the same on the basis of the client user identification information acquired at the time of reception of the print job and the transmission-source user identification information acquired at the time of reception of the authentication information.

11. The printing system according to claim 10, wherein
the transmission unit of the external terminal transmits the authentication information to the printout apparatus when short-distance wireless communication is established between the printout apparatus and the external terminal after the transmission of the print job.

12. The printing system according to claim 10, wherein
the printout apparatus further includes:
a job control unit that executes the print job when the user authentication that is executed using the authentication information received from the external terminal after the reception of the print job has succeeded.

13. The printing system according to claim 1, wherein
the transmission-source user identification information and the client user identification information each include a MAC address of the external terminal of the user.

14. The printing system according to claim 1, wherein
the transmission-source user identification information and the client user identification information each include a user ID of the user of the external terminal.

15. The printing system according to claim 1, wherein
the transmission-source user identification information and the client user identification information each include an e-mail address of the user of the external terminal.

16. The printing system according to claim 1, wherein
the print job is transmitted from the external terminal to the printout apparatus by using a first program that is executed by the external terminal, and
the authentication information is transmitted from the external terminal to the printout apparatus by using a second program different from the first program.

17. A printout apparatus for performing printing that involves authentication and being capable of communication with an external terminal, the printout apparatus comprising:
a communication unit that receives a print job from the external terminal at a time of reception of the print job, and receives authentication information from the external terminal at a time of reception of the authentication information which is different from the time of reception of the print job, the authentication information being required for user authentication in printing that involves the authentication;
an acquisition unit that acquires transmission-source user identification information for identifying a transmission source user of the authentication information when the authentication information is received from the external terminal, and acquires client user identification information for identifying a client user of the print job when the print job is received from the external terminal; and
an identification unit that identifies the authentication information received from the external terminal as information to be used for the user authentication when the transmission source user and the client user are determined to be the same on the basis of the transmission-source user identification information and the client user identification information.

18. The printout apparatus according to claim 17, further comprising:
a registration processor that registers user-authorized-to-spooling identification information for identifying a user authorized to spooling, in advance in the printout apparatus prior to the reception of the print job; and a job control unit that permits spooling of the print job when the client user is determined to be the user authorized to spooling on the basis of the client user identification information acquired at the time of reception of the print job and the user-authorized-to-spooling identification information registered in the printout apparatus.

19. The printout apparatus according to claim 17, wherein the communication unit receives the authentication information from the external terminal prior to the reception of the print job, and the acquisition unit acquires the transmission-source user identification information at the time of reception of the authentication information, the printout apparatus further comprising:

a registration processor that registers the transmission-source user identification information and the authentication information in association with each other in the printout apparatus when the authentication information has been received from the external terminal and the transmission-source user identification information has been acquired, and the identification unit identifies the authentication information that is associated with the transmission-source user identification information registered in the printout apparatus as information to be used for the user authentication when the client user and the transmission source user are determined to be the same on the basis of the client user identification information acquired at the time of reception of the print job and the transmission-source user identification information registered in the printout apparatus.

20. The printout apparatus according to claim 19, further comprising:

a job control unit that executes the print job when the user authentication that is executed using the authentication information identified by the identification unit has succeeded.

21. The printout apparatus according to claim 20, wherein the communication unit receives a standby command from the external terminal at the time of reception of the print job, the standby command being a command to wait for execution of the print job until the user authentication succeeds and the execution of the print job is permitted, and the job control unit executes the print job when the user authentication has succeeded and the execution of the print job is permitted.

22. The printout apparatus according to claim 21, wherein the execution of the print job is permitted on condition that short-distance wireless communication is established between the printout apparatus and the external terminal.

23. The printout apparatus according to claim 17, wherein the communication unit receives part of the authentication information from the external terminal prior to the reception of the print job, and the acquisition unit acquires the transmission-source user identification information when the part of the authentication information is received, the printout apparatus further comprising:

a registration processor that registers the transmission-source user identification information and the part of the authentication information in association with each other in the printout apparatus when the part of the authentication information has been received from the external terminal and the transmission-source user identification information has been acquired, wherein the communication unit receives remaining part of the authentication information, excluding the part of the authentication information, from the external terminal after the reception of the print job, and the identification unit identifies the part of the authentication information that is associated with the transmission-source user identification information registered in the printout apparatus and the remaining part of the authentication information as information to be used for the user authentication, when the client user and the transmission source user are determined to be the same on the basis of the client user identification information acquired at the time of reception of the print job and the transmission-source user identification information registered in the printout apparatus.

24. The printout apparatus according to claim 23, wherein the communication unit receives the remaining part of the authentication information from the external terminal when short-distance wireless communication is established between the printout apparatus and the external terminal after the reception of the print job.

25. The printout apparatus according to claim 23, further comprising:

a job control unit that executes the print job when the user authentication that is executed using the authentication information has succeeded, the authentication information being obtained by combining the part of the authentication information identified by the identification unit and the remaining part of the authentication information.

26. The printout apparatus according to claim 17, wherein the communication unit receives the authentication information from the external terminal after the reception of the print job, and the identification unit identifies the authentication information received from the external terminal as information to be used for the user authentication when the client user and the transmission source user are determined to be the same on the basis of the client user identification information acquired at the time of reception of the print job and the transmission-source user identification information acquired at the time of reception of the authentication information.

27. The printout apparatus according to claim 26, wherein the communication unit receives the authentication information from the external terminal when short-distance wireless communication is established between the printout apparatus and the external terminal after the reception of the print job.

28. The printout apparatus according to claim 26, further comprising:

a job control unit that executes the print job when the user authentication that is executed using the authentication information received from the external terminal after the reception of the print job has succeeded.

29. A non-transitory computer-readable recording medium that records a program for causing a computer built into a printout apparatus for performing printing that involves authentication and being capable of communication with an external terminal to execute the steps of:

a) receiving a print job from the external terminal at a time of reception of the print job;

b) acquiring client user identification information for identifying a client user of the print job when the print job is received from the external terminal;

c) receiving authentication information from the external terminal at a time of reception of the authentication information which is different from the time of reception of the print job, the authentication information being required for user authentication in printing that involves the authentication;

d) acquiring transmission-source user identification information for identifying a transmission source user of the authentication information when the authentication information is received from the external terminal; and e) identifying the authentication information received from the external terminal as information to be used for the user authentication when the transmission source user and the client user are determined to be the same on the basis of the transmission-source user identification information and the client user identification information.

* * * * *